United States Patent [19]

Hirotsu et al.

[11] Patent Number: 4,909,820

[45] Date of Patent: Mar. 20, 1990

[54] METHOD OF AND AN APPARATUS FOR BENDING GLASS PLATES FOR A LAMINATED GLASS

[75] Inventors: Takashi Hirotsu; Yukiyasu Mori; Hiroshi Tsuji; Tatsuo Sugiyama; Yoshihiro Watanabe, all of Yokohama, Japan

[73] Assignee: Asahi Glass Company Ltd., Tokyo, Japan

[21] Appl. No.: 314,922

[22] Filed: Feb. 24, 1989

[30] Foreign Application Priority Data

Feb. 25, 1988 [JP] Japan .................................. 63-40721
Mar. 10, 1988 [JP] Japan .................................. 63-55019
Aug. 17, 1988 [JP] Japan ................................. 63-203086

[51] Int. Cl.⁴ ..................... C03B 23/025; C03B 23/03
[52] U.S. Cl. ......................................... 65/106; 65/107; 65/273; 65/290; 65/291

[58] Field of Search ................. 65/106, 107, 273, 290, 65/291

[56] References Cited

U.S. PATENT DOCUMENTS

| | | | |
|---|---|---|---|
| 2,452,488 | 10/1948 | Paddock et al. | 65/273 X |
| 3,248,196 | 4/1966 | McKelvey | 65/107 |
| 4,074,996 | 2/1978 | Hagedorn et al. | 65/290 X |
| 4,684,388 | 8/1987 | Boaz | 65/106 X |

Primary Examiner—Arthur Kellogg
Attorney, Agent, or Firm—Oblon, Spivak, McClelland, Maier & Neustadt

[57] ABSTRACT

Two glass plates on a bending mold are heated in a heating/bending furnace so that they are subjected to provisional deep-bending operations by their own dead-weight, and the provisionally shaped deep-bent portion is pressed by an auxiliary pressing member to thereby form a laminated glass for, for instance, an automobile.

9 Claims, 24 Drawing Sheets

FIGURE 10
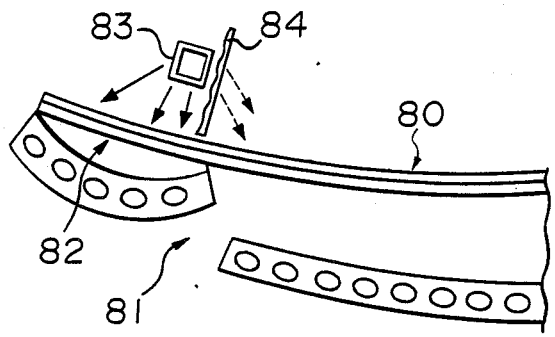
FIGURE 11
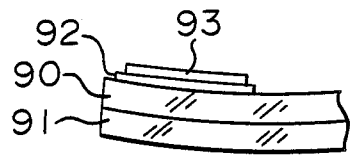
FIGURE 12(a)    FIGURE 12(b)
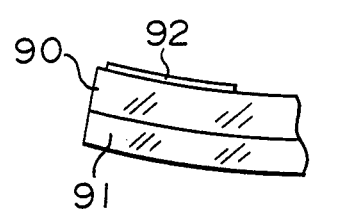 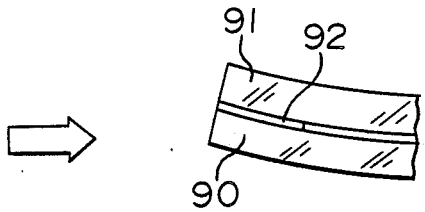

METHOD OF AND AN APPARATUS FOR BENDING GLASS PLATES FOR A LAMINATED GLASS

FIELD OF THE INVENTION

The present invention relates to a method of and an apparatus for bending two overlapping glass plates simultaneously in a heating furnace. Particularly, the present invention relates to a method of and an apparatus for bending two overlapping glass plates which is suitable for deep-bending a side portion of the overlapping glass plates.

BACKGROUND OF THE INVENTION

A laminated glass is formed by two glass plates and an intermediate plastic film such as polyvinyl butyral sandwiched therebetween, and it is widely used for a front glass as a wind-shielding window for an automobile from the standpoint of safety.

Because of requirements concerning the design of automobiles, a curved laminated glass is required. Accordingly, it is necessary to bend flat glass plates. In this case, when the glass plates are separately bent, a delicate difference in shape appears between the glass plates to be laminated. Accordingly, when they are laminated with the intermediate layer interposed therebetween, there occurs disadvantages that a complete joint between the two glass plates is not obtainable, or air bubbles result at the surfaces of bonding.

Accordingly, a method of bending simultaneously the two overlapping glass plates has been used for manufacturing the laminated glass. As a conventional method of bending glass plates for a laminated glass, there is known such a method that a bending mold having a bend-shaping surface corresponding to a curved surface of the laminated glass is prepared; two glass plates are placed on the bending mold in an overlapping state; the bending mold is transferred to a heating furnace; and the glass plates are heated to a temperature capable of softening glass so that the glass plates are bent by their own deadweight so as to correspond to the bend-shaping surface of the bending mold when the plates are softened (Japanese Examined Patent Publication No. 49-10332).

In such method, when it is necessary to bend deeply a side portion of the laminated glass, the bending mold is constituted by a fixed split mold in a ring form which has a bend-shaping surface corresponding to a middle curved portion of the laminated glass and a movable split mold (or movable split molds) in a ring form which has a bend-shaping surface corresponding to a portion to be deeply bent in a side portion of the laminated glass, and which is placed at a side (or both sides) of the fixed split mold so that it can move to the fixed mold so as to be in alignment with the fixed mold by its own deadweight. Two glass plates in a flat form are placed on the bending mold with the movable split mold (molds) being developed; the bending mold is transferred to a heating furnace along with the glass plates; the glass plates are heated to cause the softening of the glass plates; and the movable mold (molds) is moved to come in alignment with the fixed mold while the glass plates are softened, whereby a side portion of the glass plates is deeply bent by their deadweight by means of the movable mold (molds) (Japanese Examined Patent Publication No. 48-1210).

However, the conventional methods of bending the glass plates have the following disadvantages.

When the side portion of the glass plates are to be deeply bent, the side portion of the glass plates is forcibly bent by means of the movable mold which is movable by its deadweight. In such bending mold, when a degree of deep-bending of the side portion of the glass plates is increased, shaping the deep-bent portion of the glass plates is insufficient because it is difficult for the glass plates to follow a desired radius of curvature at the curved portion except for the peripheral portion of the deeply-bent glass plates, although the peripheral portion of the deep-bent glass plates can be shaped in compliance with the shape of the movable mold. Further, a portion to be deeply bent is locally heated so that it can be easily bent. However, such method is still insufficient.

In order to overcome the above-mentioned problem, it can be considered to use a pressing method by which glass plates are shaped between a pair of curved molds to thereby form a correctly curved shape of the glass plates. In such pressing method, it is necessary to hold two glass plates at a correct position in order to shape the two glass plates simultaneously to form a laminated glass. However, it is difficult to hold the overlapping glass plates at a correct position by using a known holding technique such as hanging or sucking. As a result, the pressing method can not be practically used.

As another solution, there is proposed such a method in which the two glass plates have a size greater than the desired final product of laminated glass; the two glass plates are put one on another on a bending mold, and are subjected to bending operations simultaneously to obtain a desired curved shape, and then the circumferential portions of the glass plates are cut; thus a laminated glass having a desired dimensions is obtainable. This method is advantageous in that the bending operations of the side portions of the glass plates can be easy. However, an additional cutting step is needed after the bending operations, and it requires much labor and cost.

OBJECT OF THE INVENTION

It is an object of the present invention to provide a method of deep-bending a side portion of a laminated glass and an apparatus for deep-bending a side portion of a laminated glass.

SUMMARY OF THE INVENTION

In accordance with the present invention, there is provided a method of bending glass plates for a laminated glass wherein side portions of two overlapping glass plates are simultaneously subjected to deep-bending, the method being characterized by comprising:

a provisional shaping step of heating the two glass plates placed on a bending mold by elevating their temperature to a temperature capable of bending glass at a heating/bending stage in a heating/bending furnace so that the two glass plates are provisionally shaped by their own deadweight into a shape corresponding to the shape of the bending mold, and a pressing step of pressing a portion to be deeply bent of the glass plates to a deep-bending portion of the bending mold at a pressing stage which is after the heating/bending stage in the heating/bending furnace.

In accordance with the present invention, there is provided an apparatus for bending glass plates for a laminated glass wherein side portions of two overlapping glass plates are simultaneously subjected to deep-bending, the apparatus being characterized by comprising:

a deadweight bending mold provided with a first bend-shaping surface which corresponds to a middle curved portion of the glass plates to be shaped and a second bend-shaping surface which corresponds to a portion to be deeply bent of the glass plates, and an auxiliary pressing means placed above the bending mold so as to correspond to the portion to be deeply bent of the glass plates, and a moving mechanism to move the auxiliary pressing means.

In accordance with the present invention, there is provided an apparatus for bending glass plates for a laminated glass wherein side portions of two overlapping glass plates are simultaneously subjected to deep-bending, the apparatus being characterized by comprising:

a split type deadweight bending mold provided with a first bend-shaping surface which corresponds to an intermediate curved portion of the glass plates to be shaped and a second bend-shaping surface which corresponds to a portion to be deeply bent of the glass plates, a non-split type bending mold adapted to receive thereon the two overlapping glass plates and having a bend-shaping surface for bending the glass plates in a desired shape, a transferring means to transfer the glass plates from the split type deadweight bending mold to the non-split type bending mold, an auxiliary pressing means placed above the non-split type bending mold so as to correspond to the portion to be deeply bent of the glass plates, and a moving mechanism to move the auxiliary pressing means.

The heating/bending furnace in which the two glass plates are simultaneously bent used in the present invention can be modified as desired as long as it has at least a heating/bending stage for heating the glass plates to be shaped to a temperature capable of softening glass and a pressing stage for deep-bending a side portion of the glass plates softened by heat by the aid of an auxiliary pressing member. In this case, it is preferable that the side portion of the glass plates to be deeply bent is heated at a temperature higher than that applied to the other portions at the heating/bending stage from the viewpoint of providing good processability. In order to heat a local portion of the glass plates, it is preferable to arrange at least one heater at the upper or lower side or the both sides of the glass plates to be deeply bent.

As the transferring means for transferring the two glass plates, the design of the transferring means may be changed so long as it can move the bending mold into the heating/bending furnace. For instance, a transferring means capable of moving a truck along a predetermined circulating path or a linear path, a transferring means of a conveyor such as transferring rollers, or a transferring belt made of a heat resistance properties may be used. In this case, since the positional relationship between the bending mold and an auxiliary pressing means provided with an auxiliary pressing member in the pressing stage has to be correctly determined, it is necessary to provide a mechanically positioning means or to control a position of the transferring means by means of a control system.

As to the bending mold, the design of the bending mold may be changed as desired so long as the bending mold is split into a fixed split mold and movable split molds which are made of a heat resistance material durable to an atmospheric temperature for shaping (about 600° C.–750° C.) in the heating/bending furnace. The fixed split mold and the movable split molds may be so formed as to have a shaping surface which corresponds to a curved surface glass plates to be shaped, a concave surface or a ring-like shaping surface for supporting the periphery of the glass plates. Among the above-mentioned construction, the molds having the ring-like shaping surface is preferably used from the viewpoint that the surface of the glass plates can be smooth; traces of the mold can be minimized; the glass plates can be uniformly heated; and the area of contact of the surface of the glass plates with the bending molds can be minimized so as to reduce loss of heat capacity. Further, a desired design may be applied to the movable split molds so long as they come to the fixed split mold so as to be in alignment with the same by their own deadweight. In addition, the returning movement of the movable split molds to their former positions can be adjusted by changing the structure of the movable split molds or by attaching a weight.

The design of the auxiliary pressing means may be changed as desired so long as it exerts a pressing force to a side portion of the glass plates in the direction substantially perpendicular to a bend-shaping surface, which corresponds to the middle curved portion of the glass plates to be shaped, of the bending mold fixed to a set position in the pressing stage, by means of the auxiliary pressing member, without causing any interference with the bending mold when the bending mold reaches the pressing stage. A position for installing the auxiliary pressing member is preferably determined at a suitable location in the pressing stage and above the bending mold or at the side of the transferring means, in consideration that a correct positional relationship between the bending mold and the auxiliary pressing member can be obtained. Further, problems of good thermal efficiency in the heating/bending stage and durability of the auxiliary pressing member supporting mechanism also have to be considered.

As to the shape of the auxiliary pressing member, it may be of a pipe form, or it may be so formed as to correspond to the entire surface area of the deep-bent portion of the glass plates. At least, however, the auxiliary pressing member is so formed as to have a portion having a small radius of curvature which corresponds to a deep-bent portion of the glass plates, which is difficult to be formed into a complete curved shape in the heating/bending stage. When the deep-bending portion comprises portions having different radii of curvature, an additional auxiliary pressing member having a pressing surface having the different radius of curvature is used.

Thus, the two glass plates placed on the bending mold are heated to a temperature capable of softening glass at the heating/bending stage in the heating/bending furnace so that they are subjected to a provisional shaping operation to have a shape generally in compliance with the bending mold, and then, an incompletely shaped portion of the provisionally shaped two glass plates (especially, the portion to be deeply bent of the glass plates) is subjected locally to a pressing operation so as to correspond the deep-bending portion of the bending mold at the pressing stage located at the rear of the heating/bending stage in the heating/bending furnace.

BRIEF DESCRIPTION OF THE DRAWINGS

FIGS. 8 to 10 are diagrams showing an embodiment of the method of heating a local portion of the overlapping glass plates;

FIGS. 11 to 13 are diagrams showing another embodiment of the method of the present invention;

DETAILED DESCRIPTION OF THE PRESENTLY PREFERRED EMBODIMENTS

In the following, preferred embodiments of the method of and apparatus for bending glass plates of the present invention will be described in detail with reference to the drawings.

Figure 1:
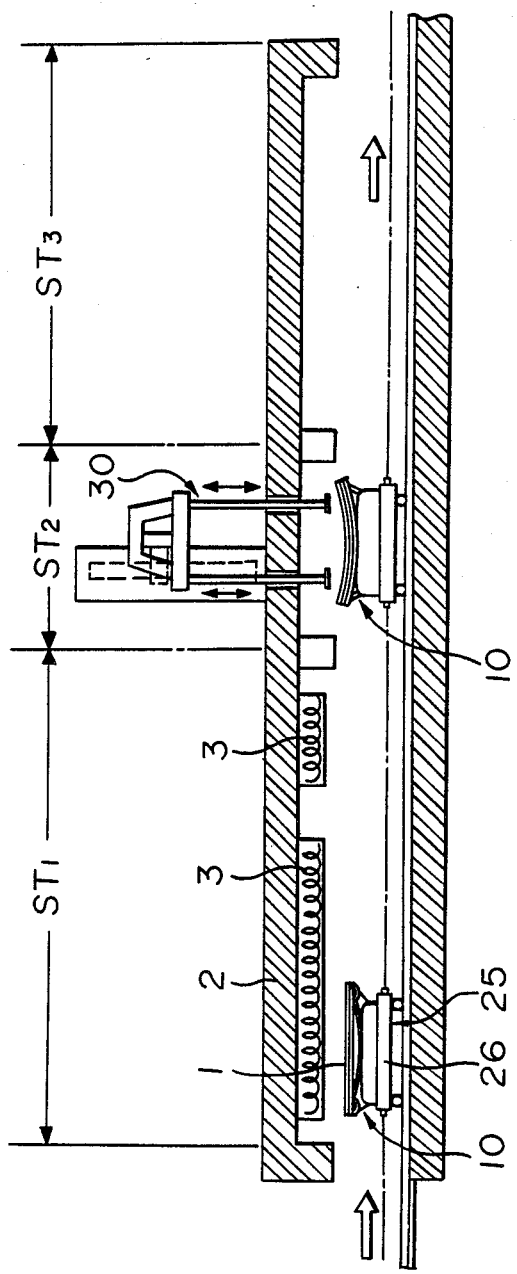
FIGS. 1 and 2 are respectively diagrams showing an embodiment of a bend-shaping apparatus for bending glass plates for a laminated glass according to the present invention.
Figure 2:
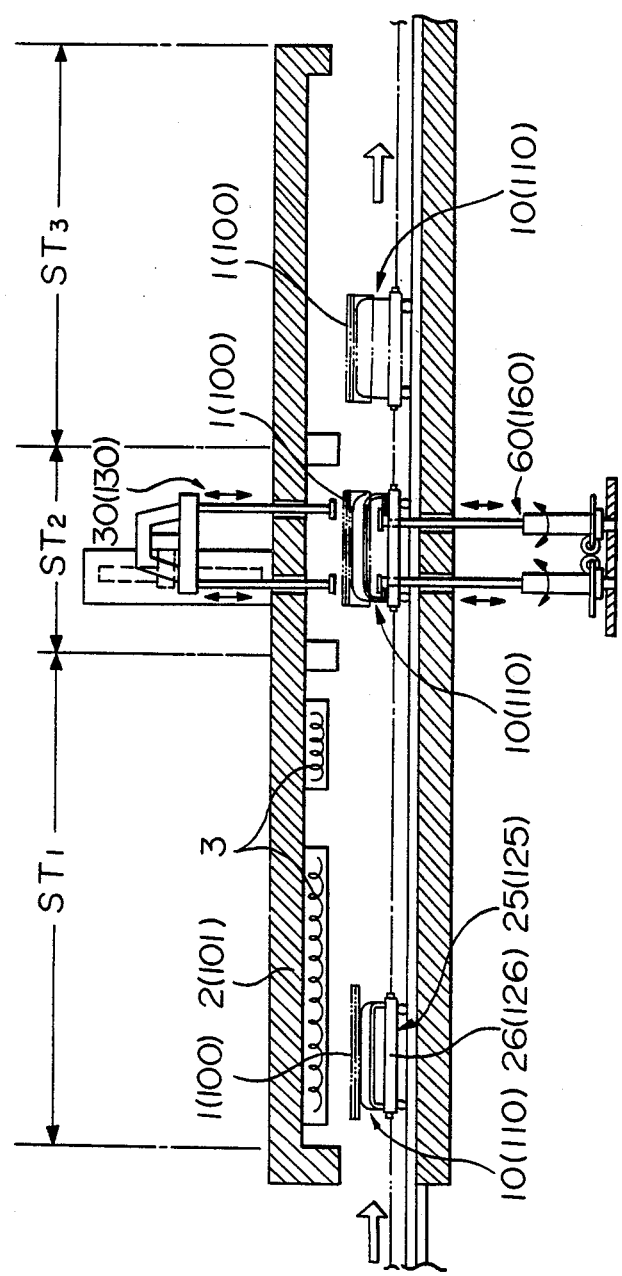

FIGS. 1 and 2 show that the present invention is applied to a bend-shaping system for bending glass plates for a laminated glass in which both side portions of overlapping glass plates are subjected to deep-bending.

In FIGS. 1 and 2, two glass plates 1 for forming a laminated glass are placed on a deadweight bending mold 10 in an overlapping state. The deadweight bending mold 10 on which the glass plates 1 are placed is moved in a heating/bending furnace 2 by means of a transferring means 25 which may be a truck 26 moved by means of a chain conveyor (not shown). The glass plates 1 placed on the deadweight bending mold 10 are moved to a heating/bending stage ST1 and then to a pressing stage ST2. The glass plates 1 are then transferred to a cooling stage ST3 outside the heating/bending furnace 2.

At the heating/bending stage ST1, the glass plates 1 are heated by heaters 3 at the heating/bending stage ST1 in the heating/bending furnace 2 to a glass-softening temperature (550° C.–600° C.) so that they are provisionally shaped along the shaping surface of the bending mold 10. At the pressing stage ST2, the incompletely shaped portion of the glass plates 1 is subjected locally to a pressing operation by means of an auxiliary pressing means 30. At the cooling stage ST3, the glass plates 1 are gradually cooled while they are moved at a controlled cooling speed along with the deadweight bending mold 10 so that an undesired strain is eliminated from the press-shaped glass plates 1. Then, the glass plates 1 are taken out from the cooing stage ST3.

FIG. 2 shows an example that the glass plates 1 are provisionally shaped in accordance with the bending mold by their own deadweight at the heating/bending stage, ST1, and which the incompletely shaped portion of the provisionally shaped glass plates 1 is subjected to pressing by means of the auxiliary pressing means 30 and a clamping means 60 at the pressing stage ST2.

As the deadweight bending mold 10 for mounting thereon the two glass plates 1, such a type of bending mold having a first bend-shaping surface which is made of a heat resistance material durable to a shaping temperature (580° C.–700 C.) for the glass plates 1 in the heating/bending furnace 2, corresponding to the middle curved portion of the glass plates 1 to be shaped, and a second bend-shaping surface corresponding to the deeply-bent portion of the glass plates 1 to be shaped is preferably used. As such type of bending mold, a mold having a shaping surface corresponding to the glass plates 1 or a mold having a ring-like shaping surface for supporting the periphery of the glass plates 1 may be used. In consideration that the surface of the glass plates 1 has to be kept smooth and that the area of contact of the bending mold to the surface of the glass plates has to be minimized, a bending mold having a ring-like surface is preferably used.

The deadweight bending mold described above may be of a fixed type (namely, a non-split type), or it may be of a split type in which the bending mold is split into a fixed split mold and a single or a plurality of movable split molds.

The deadweight bending mold as shown in FIG. 3 is of a split type. The bending mold is carried on the truck 26 as a transferring means. It comprises a ring-shaped fixed mold 11 having a bend-shaping surface 11a corresponding to the central curved portion (a shallow bent portion) of the glass plates except for the two side portions of the glass plates 1 and a pair of movable molds 12 of a ring form having a shaping surface 43 (see FIG. 14.) provided at the two sides of the fixed mold 11 so as to be movable to set positions so that a bend-shaping surface 12a in each of the movable molds 12 corresponding to the deeply bent portion of the glass plates 1 comes to alignment with the bend-shaping surface 11a of the fixed mold 11. The fixed mold 11 is fixed onto the truck 26 by means of supporting posts 13. On the other hand, each side portion in the width direction of each of the movable molds 12 is turnably supported through a pivot shaft 16 at the top of a supporting post 15 provided on a fixed bracket 14 on the truck 26. A balance weight 17 is attached to the supporting portion for each of the movable molds 12 by means of a moment arm 18 so that the movable molds 12 are urged to the set positions so as to be in alignment with the fixed mold 11.

Figure 3A:
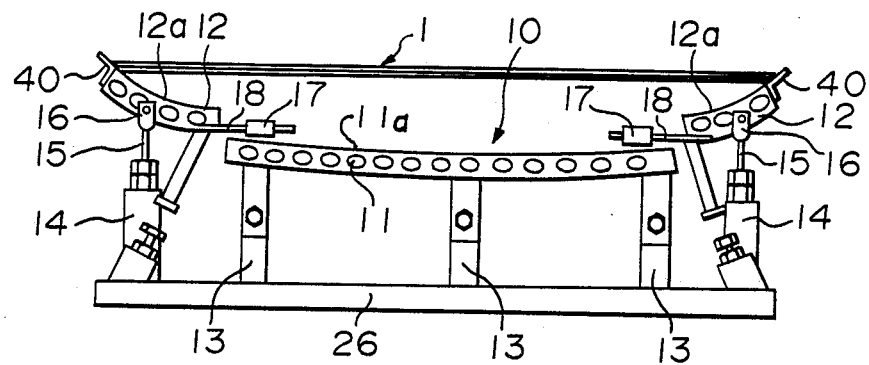
FIGS. 3 to 7 and 14 are respectively diagrams showing the entire portion or a part of the apparatus for bending glass plates of a laminated glass of the present invention.
Figure 3B:
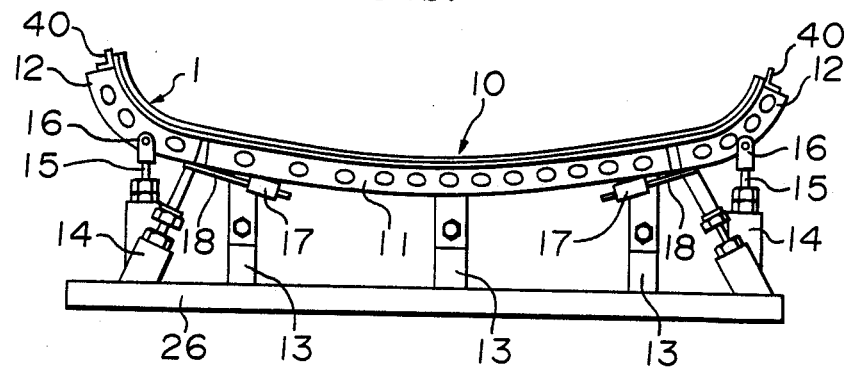
Figure 3C:
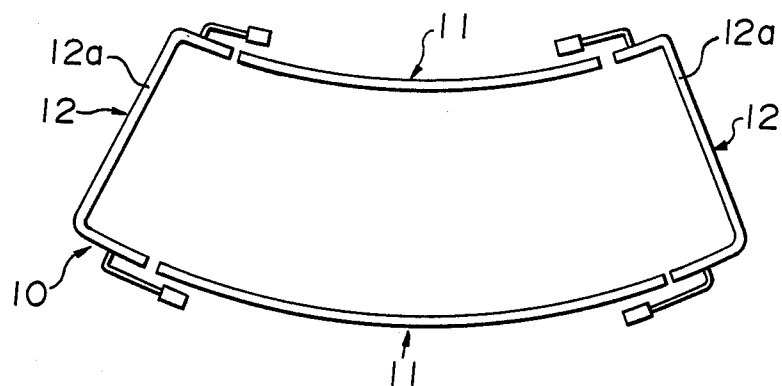

FIG. 3a shows that flat glass plates 1 are placed on the bending mold before the glass plates 1 are subjected to heating; FIG. 3b shows a condition that the glass plates are subjected to bending; and FIG. 3c shows schmatically the arrangement of the bending mold.

Figure 4:
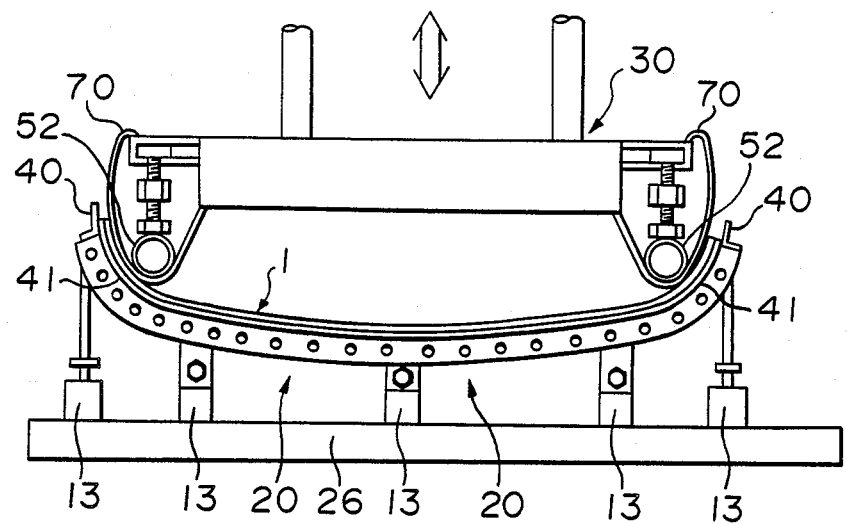
Figure 14:
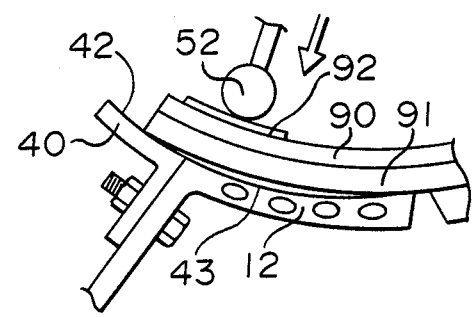

The design of the movable molds 12 may be changed so long as they can move to positions so as to be in alignment with the fixed mold 11 by their own deadweight and stop at the set positions adjacent to the fixed mold 11. The returning force of the movable molds 12 to the set positions can be adjusted by modifying the construction of the molds or by attaching each weight. When a bending mold with movable molds which correspond to deeply-bent portions of the glass plates 1 to be shaped or a non-split type mold is used, a taper ring 40 having a taper angle corresponding to the shape of curved portions at the periphery of the glass plates 1 which project from the end portions of the bending mold, is preferably provided as shown in FIGS. 3, 4 and 14. Or, edge portions of the bending mold may be extended as taper rings 40. The contacting surface of the taper ring 40 or the extention from the end portion of the bending mold which comes in contact with the lower surface of the side portion of the glass plates 1 constitutes shaping surface 42 (see FIG. 14) corresponding to a designed shape of the final product of the laminated glass so that the end portion of the glass 1 plates can be supported so as to provide a desired shape during pressing operations. Accordingly, when the provisional shaping operations by the deadweight of the glass plates 1 on the bending mold is carried out, only the end portions of the glass plates 90, 91 (see FIG. 11) are in contact with the supporting surface of the taper ring 40, and a gap remains between the lower surface of the lower glass plate 91 and the shaping surface 42 of the taper ring 40 as shown in FIG. 14. Accordingly, a trace of the mold is prevented from occurring at the inside of the edge portion of the lower surface of the lower glass 91 plate by the contact of the shaping surface 43 of the movable mold 12 with the shaping surface 42 of the taper ring 40 during the provisional shaping operations. Thereafter, by pressing the circumferential portion of the glass plates 1 by means of an auxiliary pressing member 52, a desired shape is obtainable so that the circumferential portion of the glass plates 1 corresponds to the shaping surface 42 of the taper ring 40 and the shaping surface 43 of the end portion of the movable mold 12. The taper ring 40 or the extention of the mold can be provided at an appropriate portion necessary to conduct the deep-bending operations, and it is not always necessary to provide it in the entire region of the end portion of the movable mold 12. In case of press-forming the deep-bent portion at the pressing stage ST2, the following steps may be utilized. Namely, the glass plates 1 are placed on a bending mold having the fixed mold and the movable molds as described above; heat is applied to the glass plates to perform provisional shaping by the deadweight of the glass plates; the glass plates are transferred from the deadweight bending plates to a fixed type mold of a ring form i.e., a non-split type bending mold 20 having a bend-shaping surface 41 corresponding to the deep-bent portion of the glass plates 1 (FIG. 4); and the glass plates 1 transferred to the non-split type bending mold 20 are subjected to pressing operations.

When the glass plates 1 placed on the split type bending mold as shown in FIG. 3 are subjected to pressing operations for deep-bending, the movable molds 12 may jump at the time of pressing to thereby cause deformation in a local portion of the glass plates 1. However, use of such fixed type bending mold as shown in FIG. 4 prevents the bending molds from jumping during the pressing operations for the deep-bent portion of the glass plates.

When the split type bending mold is used, it is desirable that a device for preventing the jumping of the movable mold is provided to thereby prevent the movable molds 12 from jumping at the time of press-shaping of the deep-bent portion of the glass plates 1.

As an antijumping device, a desired change of design may be made so long as the movable molds 12 of the deadweight bending mold 10 can be fixed at the set positions at the pressing stage, without causing any trouble of pressing operations, by the auxiliary pressing means 30. The location and the number of the clamping means used can be selected.

Figure 5:
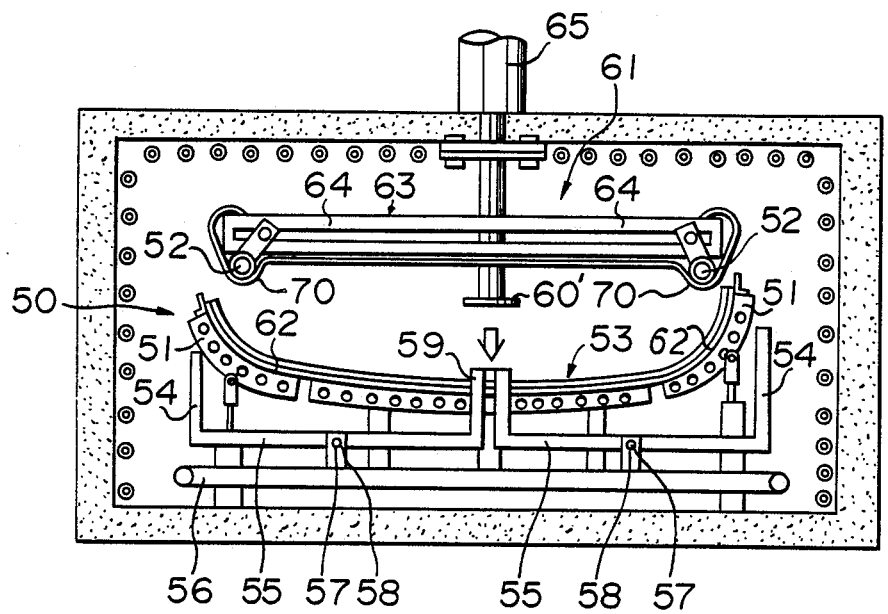
Figure 6:
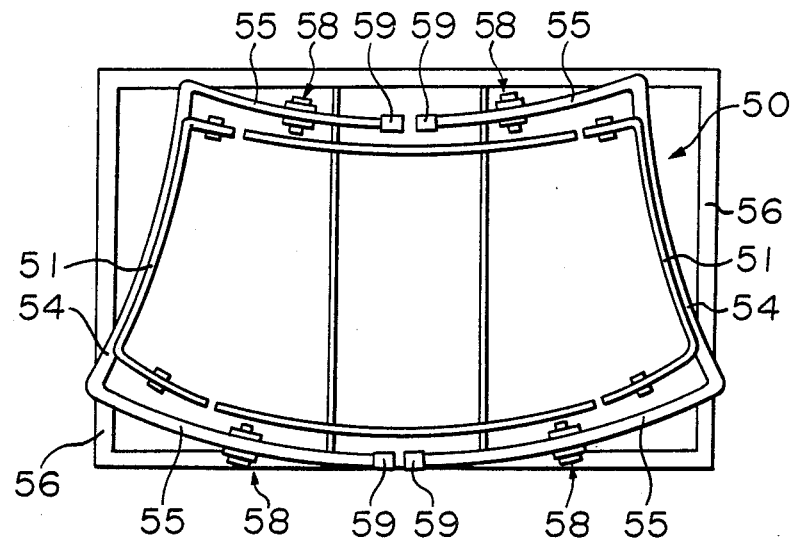
Figure 7:
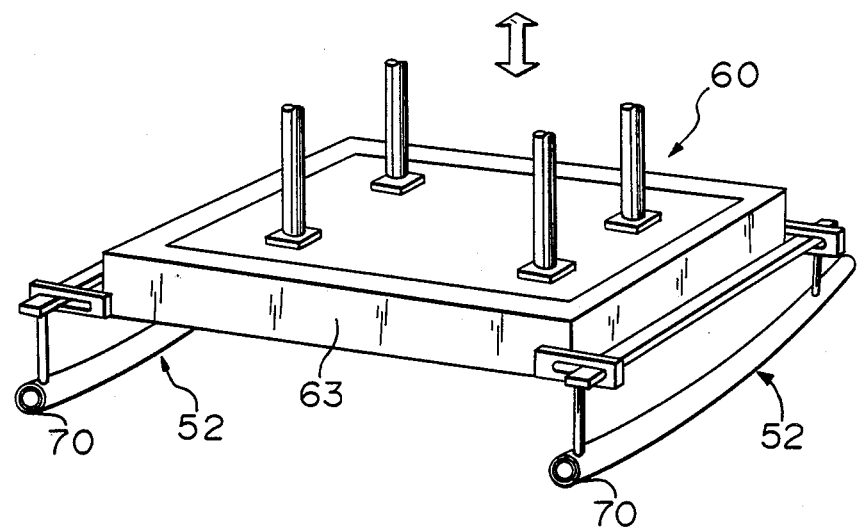

FIGS. 5 and 6 shows an embodiment of a press-shaping apparatus provided with the antijumping device for the movable molds, which is used after the provisional shaping operations of the glass plates.

In this embodiment, a pair of movable mold controlling members 54 are provided near a plurality of movable molds 51 of a bending mold 50. The movable mold controlling members 54 are located at positions suitable to give a desired curved shape to a pair of overlapping glass plates 53 by the movable molds 51 and to prevent the movable molds 51 from jumping when the glass plates 53 are pressed by the auxiliary pressing member 52. A connecting arm 55 is connected to each of the movable mold controlling members 54, and each connecting arm 55 is connected to a truck 56 by means of an associated bracket 57 and hinge 58. An engaging portion 59 is provided at the other end of each of the connecting arms 55. When the auxiliary pressing member 52 is lowered, a pushing member 60 provided at the auxiliary pressing member 52 is lowered to thereby comes in contact with the engaging portions 59 of the connecting arms 55, such contacting being caused before the auxiliary pressing member 52 is brought to contact with the deep-bent portions of the overlapping glass plates 53. Then, the movable mold controlling members 54 of the connecting arms 55 are pivoted around the hinges 58, whereby the movable molds 51 are fixed by the movable mold controlling members 54 so as to be removable during the deep-bending operations of the glass plates by the auxiliary pressing member 52. After the completion of the deep-bending operations, the contact between the engaging portions 59 of the connecting arms 55 and the pushing member 60' is raised as the auxiliary pressing member 52 is raised, and then the movable mold controlling members 54 are separated from the movable molds 51, whereby the stationary condition of the movable molds 51 is cancelled.

As shown in FIG. 5, the auxiliary pressing member 52 is so constructed that the auxiliary pressing members 52 are provided above the bending mold 50 so as to be correspond to a deep-bent portion 62 which is to be produced in the overlapping glass plates 53. The auxiliary pressing members 52 are attached to a pressing base 63 by means of supporting arms 64. The pressing base 63 is adapted in such a manner that it is moved vertically by a pressing cylinder 65 wherein, when the pressing cylinder 65 is lowered, the deep-bent portion of the overlapping glass plates 53 is press-shaped, and when the pressing cylinder 65 is raised, the pressing mold is separated. When the auxiliary pressing member 52 presses the deep-bent portion 62 for the overlapping glass plate 53, it is preferable to exert a pressing force in the direction normal to the deep-bent portion of the bending mold 50 at the contacting part of the auxiliary pressing member 52 and the overlapping glass plates 53 so that the generation of wrinkles, scars or traces of the mold can be reduced.

It is preferable that the auxiliary pressing members are coated with heat insulating cloth 70 such as glass fibers, silica fibers, ceramic fibers, metallic fibers and so on in order to prevent a trace of the bending mold from generating on the surface of the overlapping glass plate 53 when the pressing operations are conducted.

Figure 8:
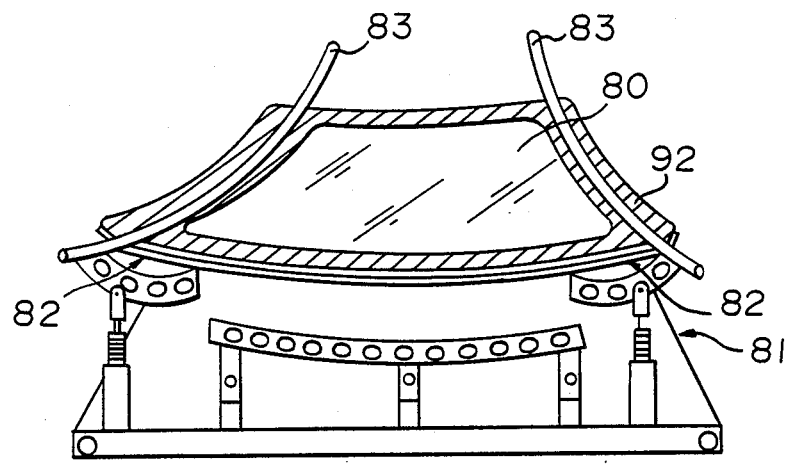
Figure 9:
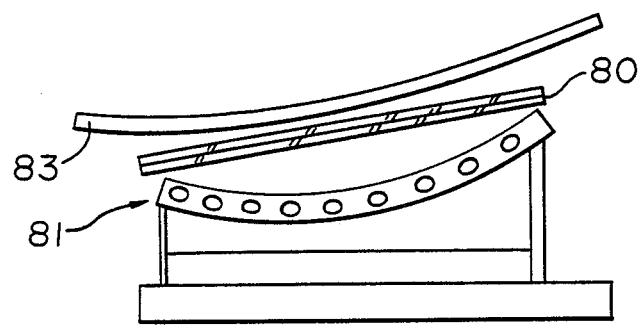

FIGS. 8 to 10 shows another embodiment of the bending mold, wherein heaters 83 are provided at positions corresponding to deep-bent portions 82 and above glass plates 80 so that deep-bending operations for the deep-bent portions 82 of the glass plates 80 can be easy when the glass plates 80 placed on a split type bending mold 81 are subjected to bending operations by their own deadweight. Thus, by utilizing heaters 83, the deep-bent portions of the glass plates 80 are heated at a temperature, for instance, 10° C.-100° C. higher than that for the other portions, whereby the bending operations by the deadweight can be easy. The heaters 83 may be arranged above or below the glass plates 80. Or, they may be arranged both above and below the glass plates 80. The shape of the heaters 83 may be in a curved shapes corresponding to the shape of the deep-bent portions 82 of the glass plates 80 may be a linear form extending in the longitudinal direction, or in a partially curved form, or may have a further complicated shape.

FIGS. 8 and 9 show a heater 83 or heaters 83 having a curved from.

When it is desired that heat by the heaters does not affect other portions when the glass plates 80 are heated, a heat shielding material 84 such as a heat shielding curtain, a heat shielding plate is arranged at a desired position so that undesired heat from the heaters 83 can be cut as shown in FIG. 10.

Figure 13:
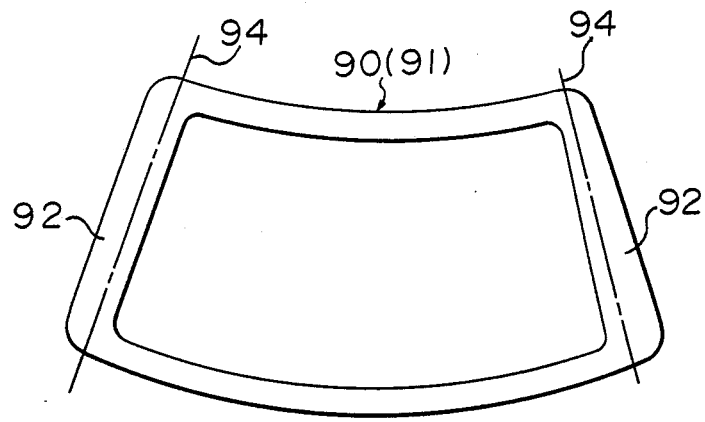

As an embodiment of the method according to the present invention, it is possible as shown in FIG. 13 that a colored zone 92 may be formed by printing colored ink of a colored ceramics at an area including deep-bent portion (including a line 94 of bending) which is formed by pressing the overlapping glass plates 90, 91. Since the printed zone of the colored ink of colored ceramics is formed at the portion to be press-shaped and the colored ink is attached on the surface of the glass plate by baking in a heating step prior to the press-shaping operations, a scar or a trace resulted during the press-shaping operations is not conspicuous, and a defect in appearance can be concealed owing to the colored zone 92 even though there occurs such trace and scar at the circumferential portion of the glass plates by the pressing operations.

In a case that among the two overlapping glass plates 90, 91, the colored zone 92 is formed by printing colored ink of colored ceramics on the upper surface of the deep-bent portion of the upper glass plate 90 as shown in FIG. 11, color ink adheres on the heat resistance cloth covering the surface for pressing of the auxiliary pressing member to thereby shorten the lifetime of the heat resistance cloth or result in a trace on the surface of the colored zone 92 of the colored ink of colored ceramics which is formed by baking. To eliminate this problem, a layer of a mold release agent 93 of heat resistance is formed by printing on the surface of the colored zone 92 of the colored ink so that good releasing properties is obtainable between the colored zone 92 of the colored ink and the heat resistance cloth of the auxiliary pressing member. Boron nitride or carbon may be used for the release agent having good heat resistance properties.

In order to prolong the lifetime of the heat resistance cloth which covers the auxiliary pressing member or to improve the surface of the glass plates 90, 91 on which a colored zone 92 of colored ink is formed by baking, the following measures can be taken. Namely, the two overlapping glass plates 90, 91 are provisionally shaped by utilizing their own deadweight, the position of the upper (90) and lower (91) glass plates is reversed i.e., the upper glass plate 90 is brought to the lower side of the lower glass plate 91 so that the glass plate 90 on which the colored zone 92 of the ceramic colored ink is formed by baking is below the other glass plate (91) before the press-shaping operations, and the circumferential portion of the glass plate 91 where no colored zone 92 is formed is subjected to the press-shaping operations, whereby the adhesion of the colored ink to the heat resistance cloth can be prevented.

Preferred embodiment of the apparatus for bending glass plates for a laminated glass according to the present invention will be described with reference to FIGS. 15 to 32.

Figure 15:
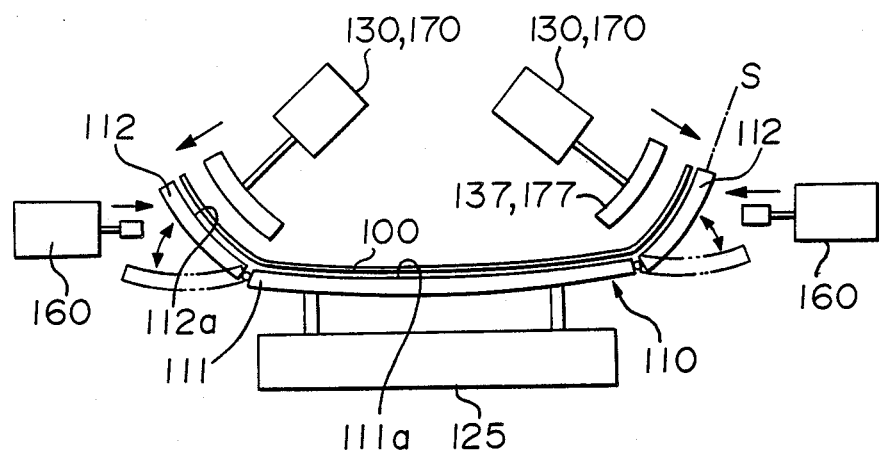
FIG. 15 is a diagram of another embodiment of the apparatus for bending glass plates for a laminated glass according to the present invention.

FIG. 15 shows an embodiment of such apparatus in order to realize the method of bending glass plates for a laminated glass of the present invention. The apparatus is adapted to deep-bend side portions of two overlapping glass plates 100 simultaneously.

The bend-shaping apparatus comprises a fixed mold 111 having a bend-shaping surface 111a as a supporting surface which corresponds to a generally curved portion of the overlapping glass plates 100 to be shaped for a laminated glass, movable molds 112 each having a bend-shaping surface 112a as a supporting surface corresponding to a deep-bent portion of the overlapping glass plates 100 to be shaped, the movable molds 112 being movable to the end portions of the fixed mold 111 so as to be in alignment with the fixed mold 111 by their own deadweight, and a bending mold 110 moving the movable molds 112 to set positions S which are in alignment with the fixed mold 111 when the overlapping glass plates 110 placed in a state of bridging both the fixed and movable molds 111, 112 are heated to a temperature suitable for bending the overlapping glass plates, a transferring means 125 for transferring the bending mold 110 to a heating/bending stage in a heating/bending furnace where the overlapping glass plates 100 are heated to the bending temperature, and thereafter for transferring the bending mold 110 to the next pressing stage in the heating/bending furnace, an auxiliary pressing means 130, 170 which are respectively provided with auxiliary pressing members 137, 177 having a curved surface corresponding to the deep-bent portions of the the overlapping glass plates 100 and are adapted to push the auxiliary pressing members 137, 177 to the portions where the overlapping glass plates 100 are deeply bent and provisionally shaped by their own deadweight into shapes substantially corresponding to the shape of the bending mold 110 at the heating-/bending stage, and clamping means 160 for fixing the movable molds 112 to the set positions S during the pushing operations by the auxiliary pressing means 130, 170.

The design of the clamping means 160 may be changed as desired so long as the movable molds 112 can be fixed at the set positions S at the pressing stage without causing a trouble concerning the auxiliary pressing means 130, 170. The location and the number of clamping means can be selected.

Figure 16:
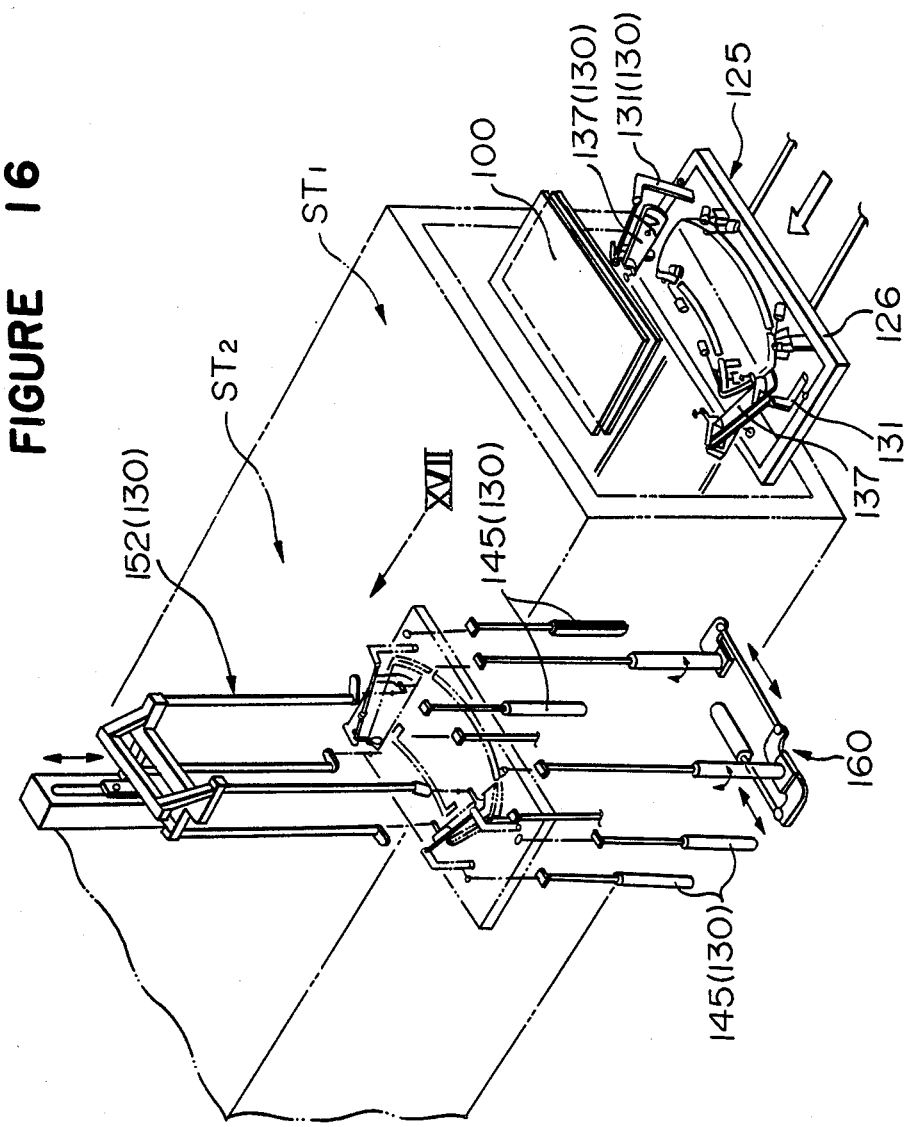
FIG. 16 is a perspective view of an important portion of the apparatus according to the present invention.
Figure 17:
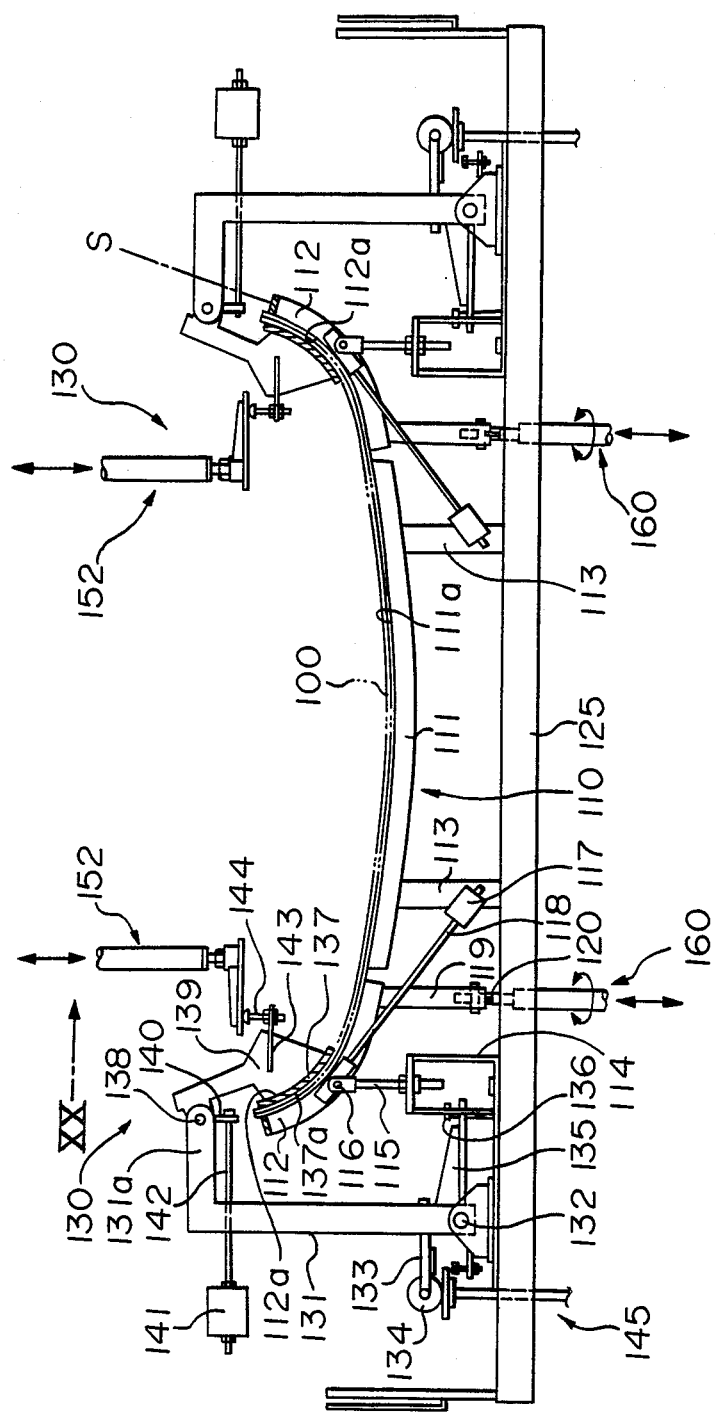
FIG. 17 is a side view viewed from the direction of XVII in FIG. 16.
Figure 18:
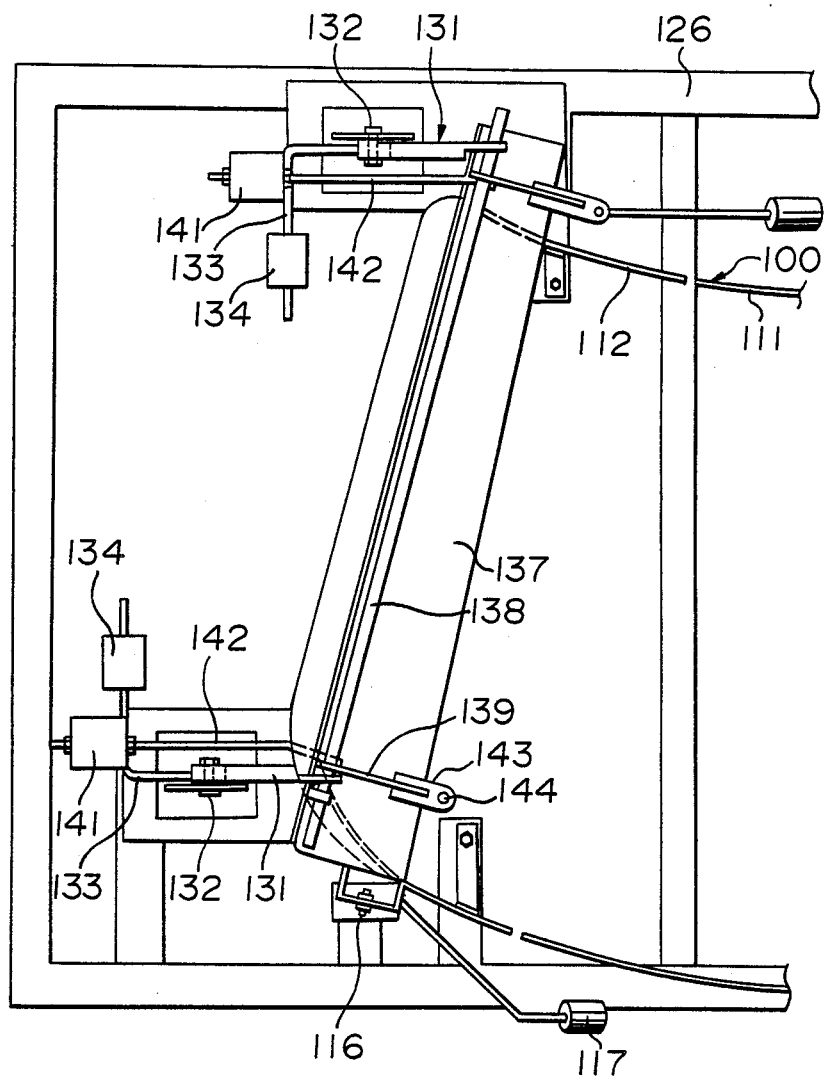
FIG. 18 is a side view showing a part of the apparatus as shown in FIG. 17.

The bending mold 110 as shown in FIGS. 16 to 18 is provided on a truck 126 of the transferring means 125 in the same manner as the bending mold 10 as shown in FIG. 3. The bending mold 110 is provided with the fixed mold 111 of a ring form which has the bend-shaping surface 111a corresponding to a generally curved portion (a shallow curved portion) except for the two side portions of the overlapping glass plates 100 for a laminated glass subjected to deep-bending operations, and the movable molds 112 of a ring form which are provided at both sides of the fixed mold 111 so as to be movable, each having the bend-shaping surface 112a corresponding to the deep-bent portion of the overlapping glass plates 110, the bend-shaping surface 112a coming to a set position which is in alignment with the bend-shaping surface 111a of the fixed mold 111. The fixed mold 111 is fixed to the truck 126 by means of supporting posts 113, and each side portion in the width direction of each of the movable molds 112 is supported on a fixed bracket 114 on the truck 126 so that it is swingable at the end of a corresponding supporting post 115 by means of a pivotal shaft 116. A balance weight 117 is attached to the supporting portion of each of the movable molds 112 by means of a moment arm 118 so that the movable molds 112 are urged to the set positions S which is in alignment with the fixed mold 111. Stopper arms 119 having an L-shape in cross section is attached to each side in the width direction of the movable molds 112. Each upper end of the stopper arms 119 is extended to the truck 126. When the movable molds 112 reach the set positions S which are in alignment with the fixed mold 111, the end of each stopper arm 119 comes in contact with a stopper wall 120 the length of which is adjustable with respect to the truck 126.

As shown in FIGS. 16 to 21, the auxiliary pressing means 130 has a pair of supporting arms 131 set up on a truck 126 so as to be capable of coming to and separating from the movable molds 112, the auxiliary pressing member 137 attached to the free end of each of the supporting arms 131, a pair of supporting arm driving means 145 adapted to set each of the supporting arms 131 the vertical position at the pressing stage ST2, and a pair of auxiliary pressing member driving means 152 adapted to move each of the auxiliary pressing members 137 toward the movable molds 112 having come to the set positions S by a predetermined distance after the supporting arms 131 have been brought to the vertical position at the pressing stage ST2.

In this embodiment, as shown in FIGS. 17 and 18, the supporting arms 131 are respectively formed to have an inverse L-shape in which a bent portion 131a extends above and toward the movable molds 112, and have respective ends which are connected to the truck by means of pivotal shafts 132 at the outerside of the movable molds 112. A rod 133 is formed near the base portion of each of the supporting arms 131 to extend outwardly thereby forming an L-shape, and a weight roller 134 is rotatably fitted to the free end of the rod 133 so that the supporting arm 131 is supported at an inclined position. On the other hand, a stopper piece 135 is formed near the base portion of each of the supporting arms 131 so as to extend toward the bending mold 110. A stopper member is formed at the free end of the stopper piece 135 so that the vertical position of the supporting arms 131 is restricted by a contact of the stopper bolt 136 (the length of which is adjustable) to the frame of the truck 126.

The auxiliary pressing member 137 is constituted by a plate-like body having a curved surface 137a corresponding to the bend-shaping surface 112a of each of the movable molds 112. The auxiliary pressing member 137 is turnably held by each of the supporting arms 131 located at the outside of the movable molds 112 within a predetermined angle by means of a swing arm 139 which is turnable around a pivotal shaft 138 provided at the free end of the bent portion 131a of the supporting arm 131. An extension 140 projects from the pivotal shaft 138 in the radial direction, and a weight 141 is attached to the extension 140 through a rod 142 so as to urge the auxiliary pressing member 137 apart from the movable mold 112. A flat plate 143 is attached to a part of the swing arm 139, and an engage bolt 144 capable of adjusting the length is attached to an appropriate position of the flat plate 143. The contacting surface of the auxiliary pressing member 137 has a cover (not shown) made of a heat resistant material such as cloth of glass fibers, silica fibers, ceramic fibers and so on in order to avoid making marks of pressing member on the glass and to absorb shock during pressing.

Figure 19:
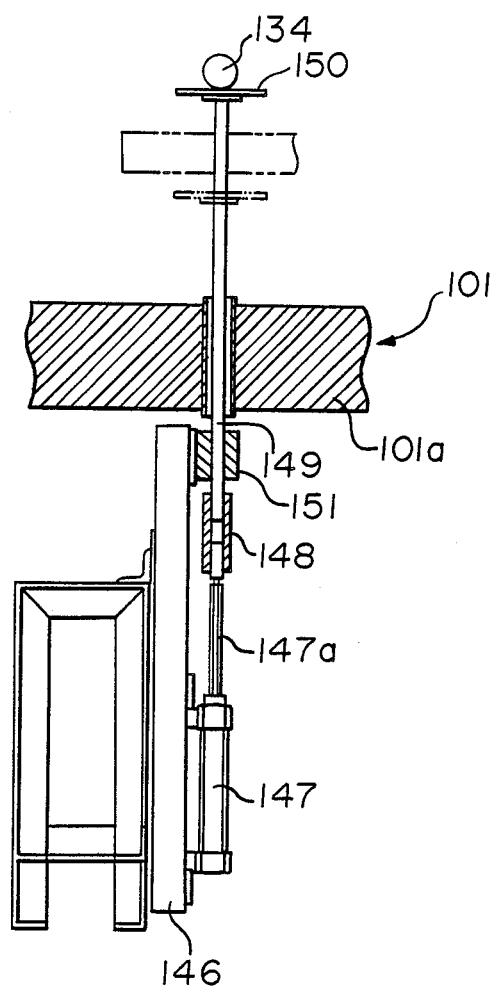
FIG. 19 is a diagram showing a supporter driving means of an auxiliary pressing means used for an embodiment of the present invention.
Figure 20:
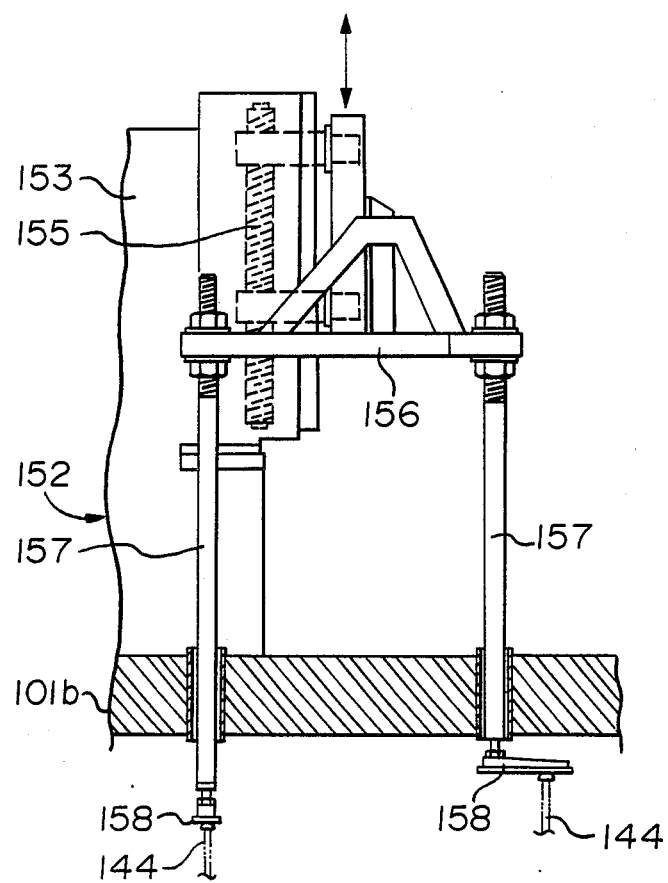
FIG. 20 is a side view viewed from the direction of XX in FIG. 17, which shows in detail an auxiliary pressing member driving means of the auxiliary pressing means used for an embodiment of the present invention.
Figure 21:
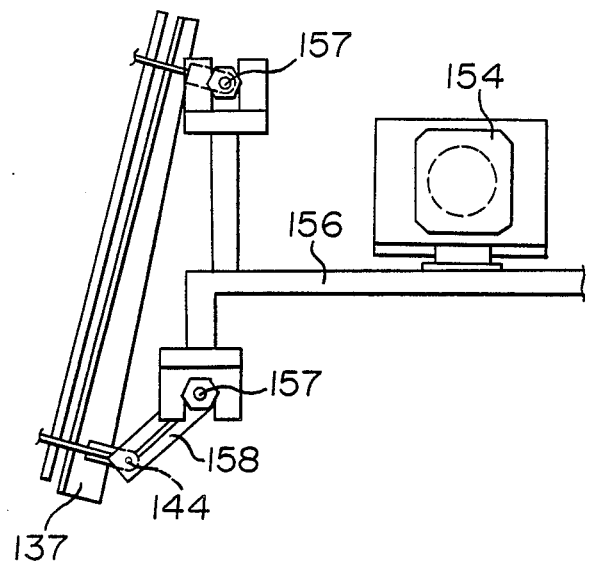
FIG. 21 is a plane view of the auxiliary pressing member driving means.

As shown in FIGS. 16, 17 and 19, the supporting arm driving means 145 is constituted by an air cylinder 147 having a piston rod 147a as a driving source attached to a fitting frame 146 arranged below a heating/bending furnace 101, an operating rod 149 connected to the piston rod 147a of the air cylinder 147 through a coupling 148, the operating rod being passed through the lower wall 101a of a heating/bending furnace 101, and a pushing plate 150 attached to the end of the operating rod 149. The supporting arm driving means 145 is operated in such a manner that when the air cylinder 147 is actuated, the piston rod 147a is upwardly extended, whereby the weight roller 134 is pushed up by means of the pushing plate 150 by a predetermined distance, in more detail, until the supporting arm 131 reaches to the vertically extending position. In FIG. 19, a reference numeral 151 designates a guide to stabilize the vertical movement of the operating rod 149. As shown in FIGS. 16, 17, 20 and 21, the auxiliary pressing member driving means 152 is so constructed that a driving motor 154 (FIG. 21) as a driving source is mounted on a fitting frame arranged above the heating/bending furnace 101, a driving force from the driving motor 154 is transmitted to a movable bracket 156 through a ball screw 155, a plurality of hanging rods 157 are fixed to the movable bracket 156 in positions which correspond to the engage bolts 144, the hanging rods 157 are arranged so as to pass through an upper wall 101b of the heating/bending furnace 101, and a contacting plate 158 is attached to the end of each of the hanging rods 157 so as to contact with the engage bolts 144. In the operation of the auxiliary pressing member driving means 152, when the driving motor 154 is driven, the hanging rods 157 are lowered, whereby the engage bolts 144 are pushed down by means of the contacting plates 158 by a predetermined distance (i.e., to a set position for bend-shaping operations) so that the auxiliary pressing member 137 is kept apart from the bend-shaping surface 112a of the movable mold 112 by an amount of distance of the thickness of the two overlapping glass plates 100.

As shown in FIGS. 16, 17 and 22 to 25, the clamping means 160 is so constructed that an air cylinder 162 having a piston rod 162a is arranged corresponding to the position of the stopper arm 119 on a corresponding fitting frame 161 which is arranged below the heating-/bending furnace 101, an operating rod 163 is connected to the free end of the piston rod 162a of the air cylinder 162 by means of a coupling (not shown), the operating rod 163 being passed through the lower wall 101a of the heating/bending furnace 101, a clamping pawl 164 is attached to the free end of the operating rod 163, the air cylinder 162 is turnably held by the fitting frame 161 by means of an L-shaped link plate 165, a link rod 166 is operably connected between link plates 165 (165a, 165b) for the air cylinders 162 which are placed in the width direction of the heating/bending furnace 101, an L-shaped link piece 167 is formed on one of the link plates 165 which is connected to the link rod 166, and a piston rod 168a for an air cylinder 168 is operatively connected to the end of the link piece 167 to be capable of turning.

The clamping means 160 operates as follows.

Figure 22:
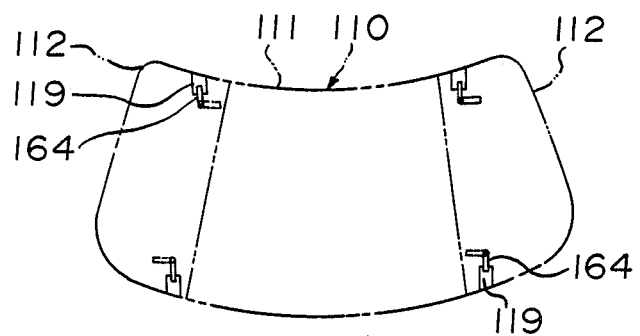
FIG. 22 is a diagram showing an arrangement of clamping pawls of a clamping means used for an embodiment of the present invention.
Figure 23:
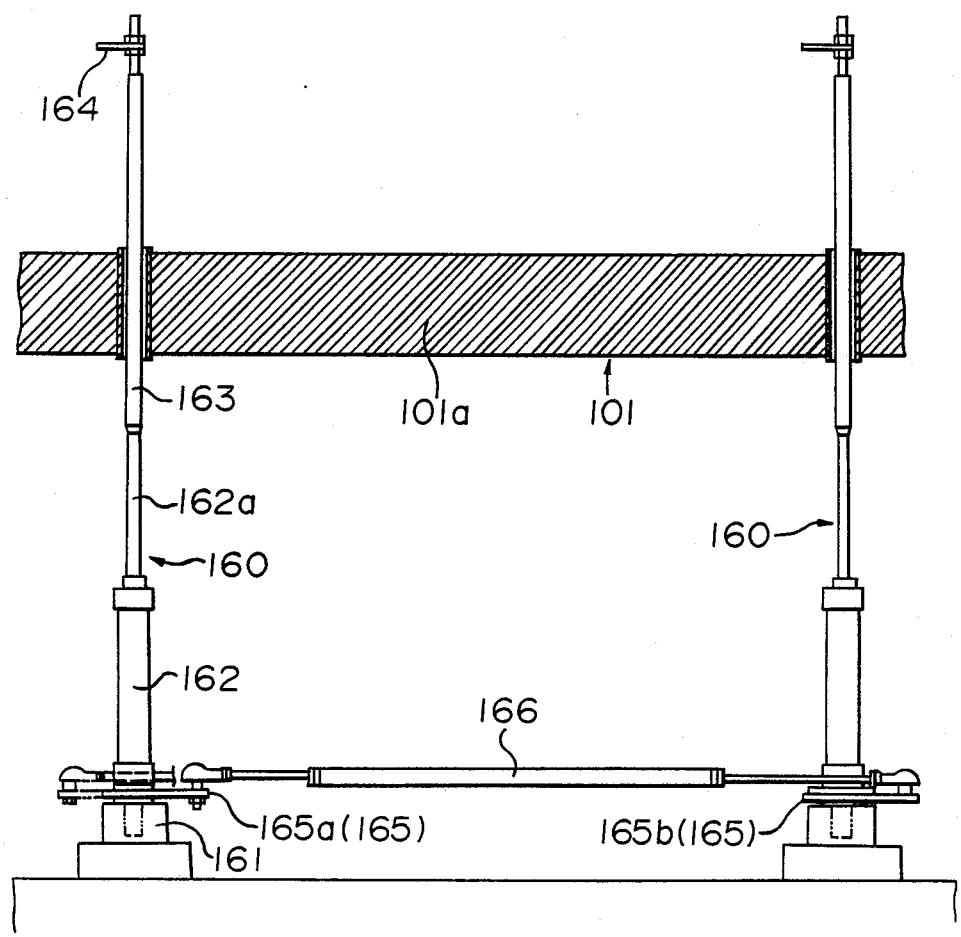
FIG. 23 is a diagram showing a driving system in the clamping means in detail.
Figure 24:
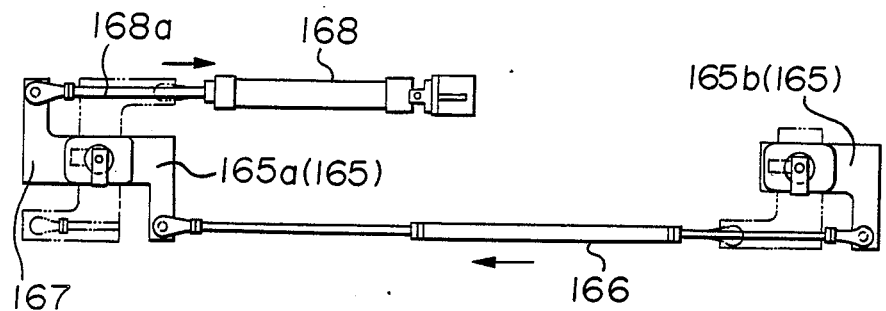
FIG. 24 is a side view viewed from the direction of XXIV in FIG. 23.
Figure 25:
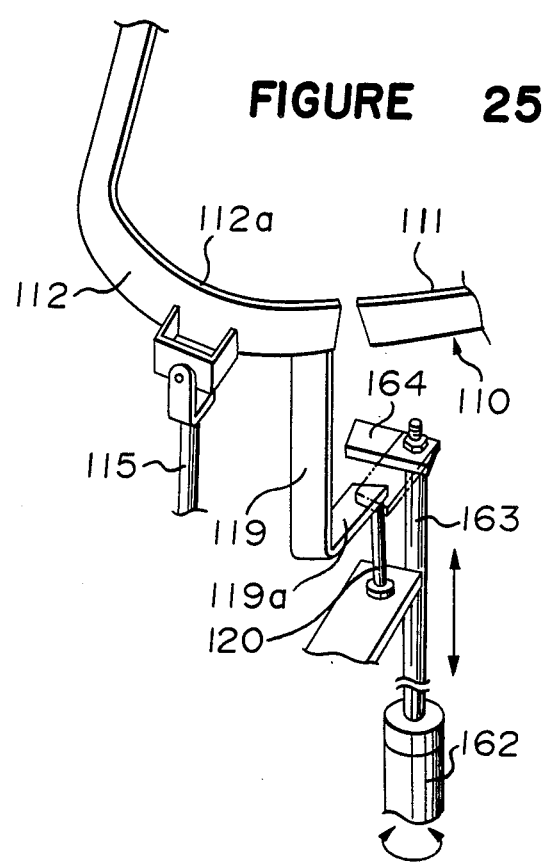
FIG. 25 is a perspective view partly broken of the clamping means used for an embodiment of the present invention.

As shown in FIGS. 22 and 25, the clamping pawls 164 are brought to the non-clamping position (as shown in FIG. 22 by imaginary lines) which does not interfere with the stopper arms 119 at the time when the movable molds 112 are brought to the positions S. In such condition, the piston rods 162a of the air cylinders 162 are extended to raise the clamping pawls 164 above bent portions 119a of the stopper arms 119. Then, the air cylinder 168 is operated to thereby turn the air cylinders 162 by, for instance, 90°, whereby the clamping pawls 164 are followed to the clamping position as indicated by solid lines in FIG. 22. Thereafter, the piston rods 162a of the air cylinders 162 are retracted, whereby the stopper arms 119 are clamped between the clamping pawls 164 and the stopper walls 120.

In the bend-shaping system for the glass plates for a laminated glass in accordance with the above-mentioned embodiment of the present invention, operations at the heating/bending stage ST1 and the pressing stage ST2 as shown in FIG. 2 will be described.

Figure 26A:
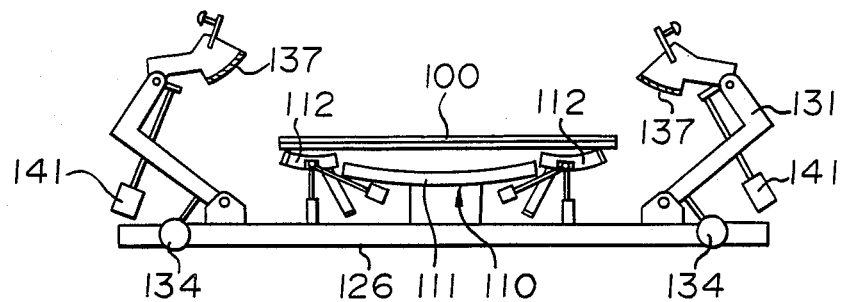
FIGS. 26a to 26c are respectively diagrams showing each step of bend-shaping operations of glass plates for a laminated glass according to an embodiment of the present invention.

Bending operations for two overlapping glass plates for a laminated glass are carried out as follows. As shown in FIG. 26a, two flat glass plates 100 are put on the bending mold 110 at a predetermined position by means of a suitable positioning means in a overlapping state. Since the glass plates 100 have rigidity to some extent, the movable molds 112 are held in a developed state because of the balance weights 117 having a greater moment. In this case, the supporting arms 131 of the auxiliary pressing members 137 are at the inclined positions.

Figure 26B:
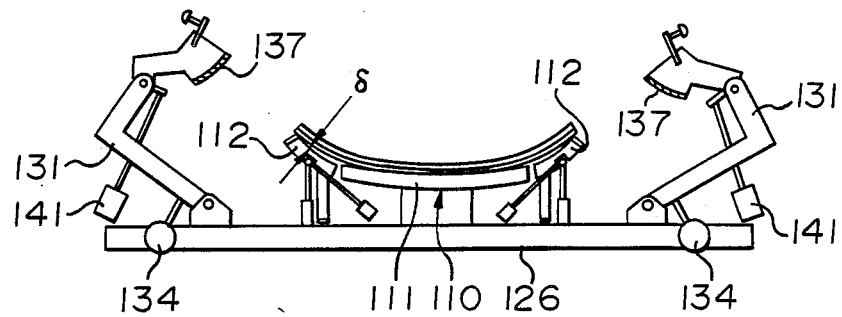
Figure 26C:
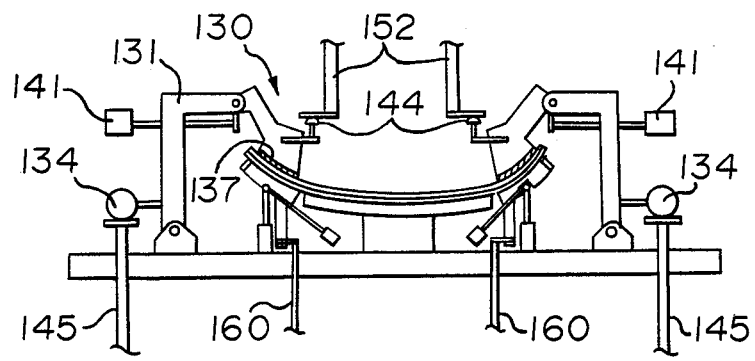

In such state, when the glass plates 100 are transferred into the heating/bending stage ST1, the glass plates 100 are heated to a temperature capable of bending glass and are gradually softened. Then, the rigidity of the glass plates 100 becomes less as the glass plates 100 are softened, and the portion except both sides of the glass plates 100 changes their shape so as to correspond to the bend-shaping surface 111a of the fixed mold 111 as shown in FIG. 26b. On the other hand, the movable molds 112 gradually rise since the moment of the balance weights 117 overcome the rigidity of the glass plates 100, and finally the movable molds 112 reach the set positions S, whereby the two sides of the glass plates 100 are subjected to deep-bending by their own deadweight so as to correspond to the bend-shaping surfaces 112a of the movable molds 112. However, when the glass plates 100 had to be subjected to deep-bending to have a curved portion of a small radius of curvature, portions except for the edge of the two side portions of the glass plates 100 can not follow the deformation although the edges of the two side portions of the glass plates 100 can deform so as to correspond to the shape-bending surfaces 112a of the movable molds 112 to thereby produce gaps between the glass plates and the shaping surfaces for deep-bending. In this case, the deep-bending operations for the both side portions of the glass plates 100 are incomplete; thus the heating-/bending stage ST1 performs only a provisional shaping step for the glass plates 100. Thereafter, the provisionally shaped glass plates 100 are transferred into the pressing stage ST2. When the truck 126 carrying the glass plates 100 is stopped at a predetermined position, the supporting arm driving means 145 of the auxiliary pressing means 130 operate to push up the weight rollers 134 to thereby set the supporting arms 131 at the vertical positions. Then, the clamping means 160 restrict the movable molds 112 at the set positions S by clamping the stopper arms 119 as shown in FIG. 26c.

Figure 27:
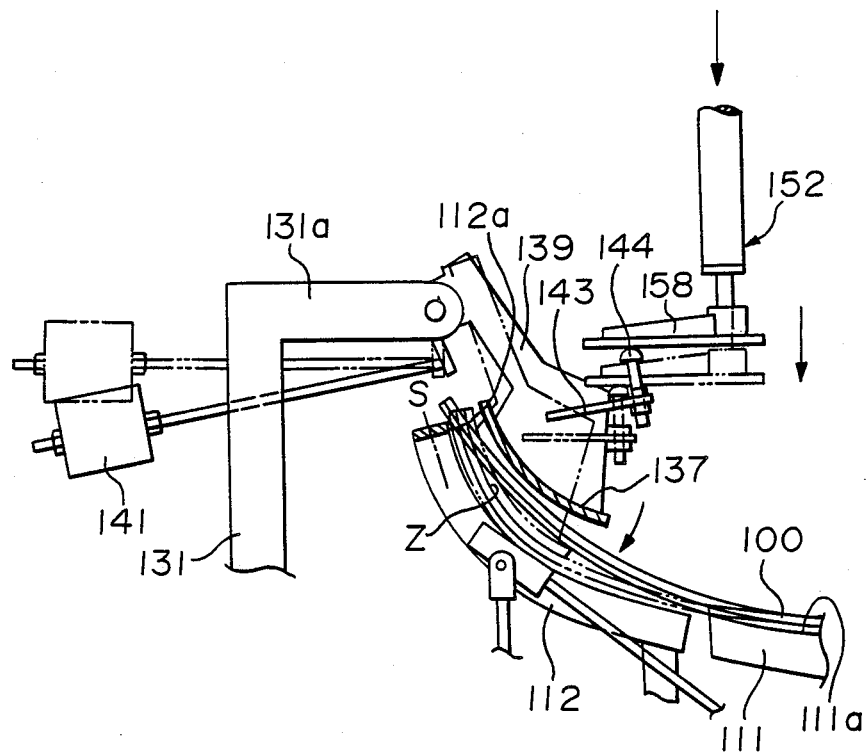
FIG. 27 is a diagram showing in detail the auxiliary pressing step of FIG. 26c.
Figure 28:
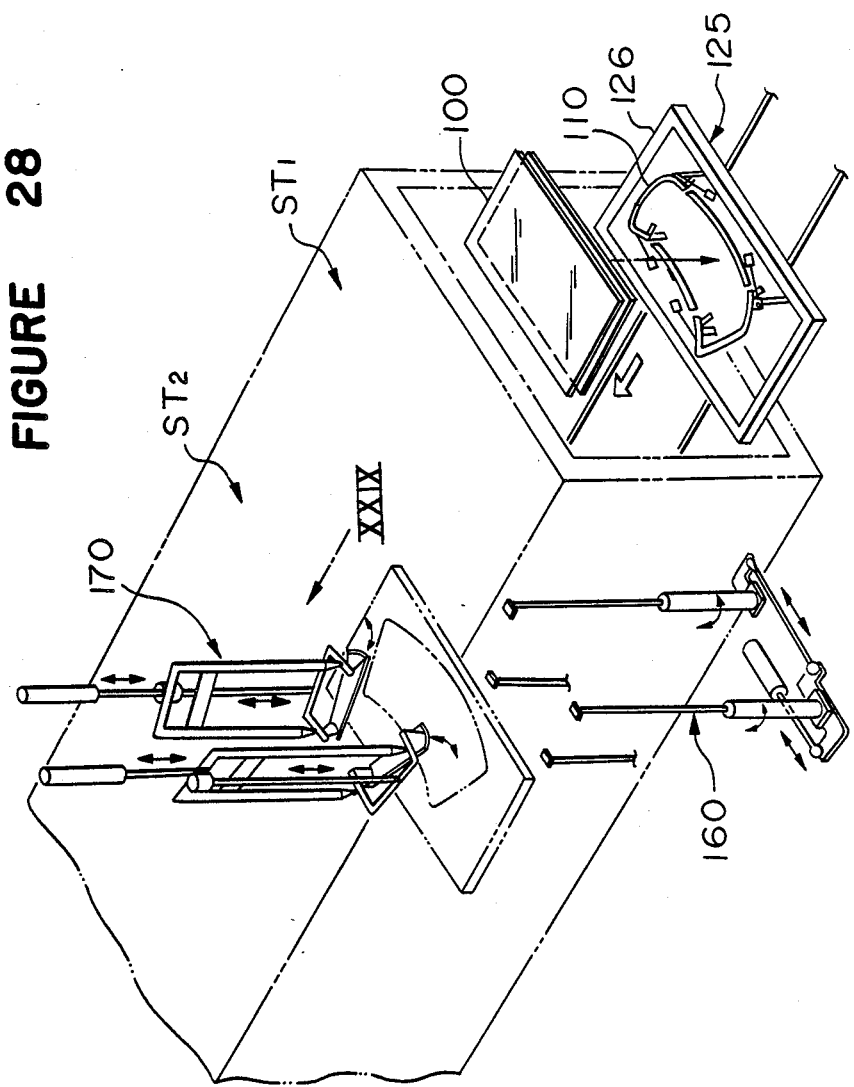
FIG. 28 is a perspective view showing an important portion of another embodiment of the apparatus for bending glass plates for a laminated glass according to the present invention.
Figure 29:
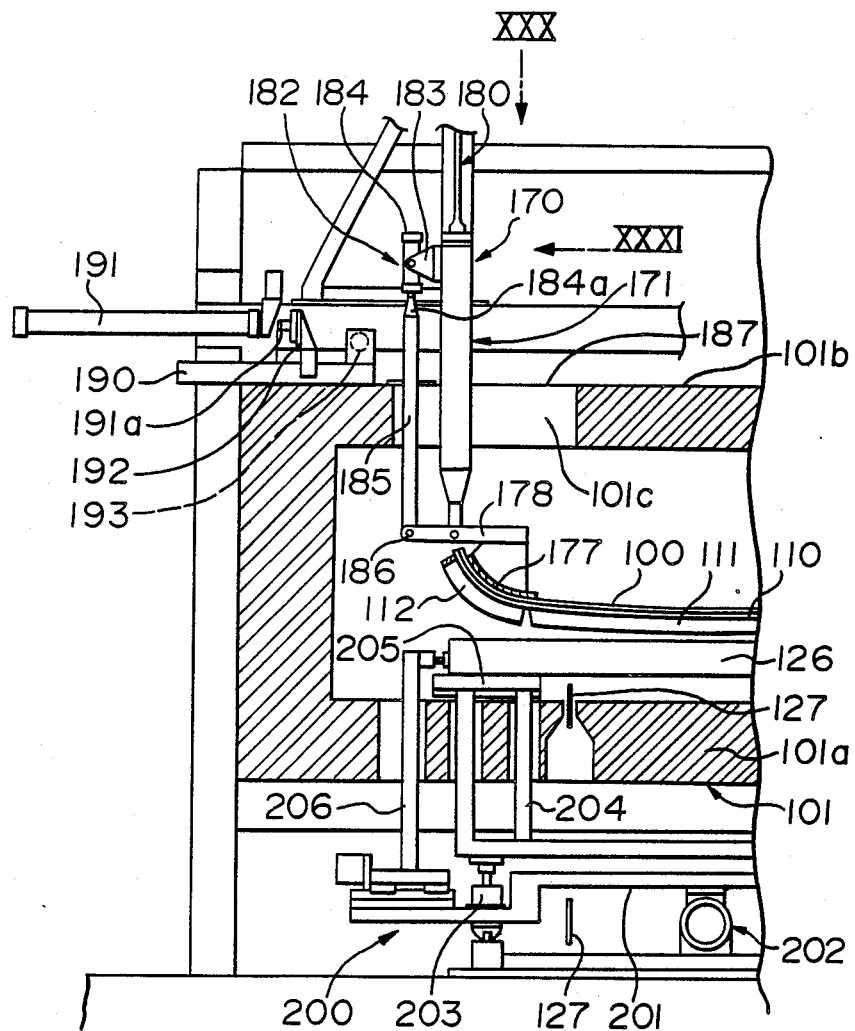
FIG. 29 is a side view partly broken of the auxiliary pressing means, which is viewed from the direction of XXIV in FIG. 28.
Figure 30:
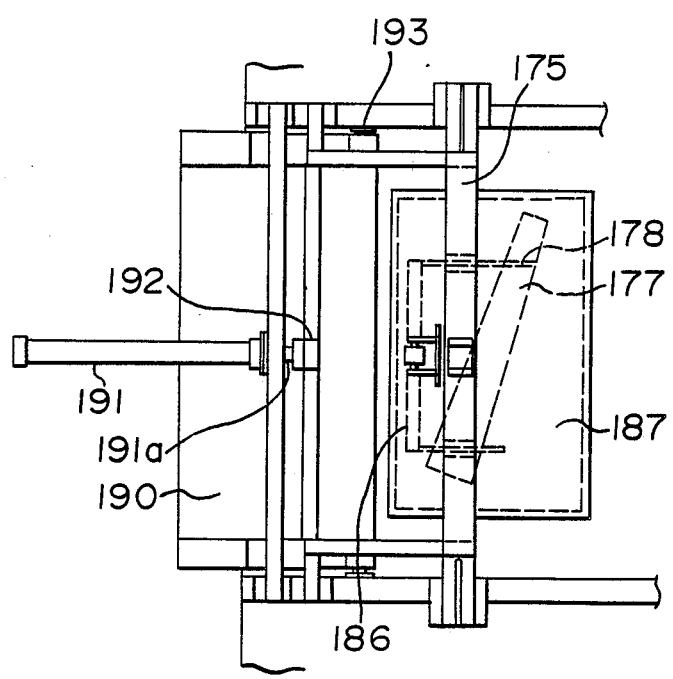
FIGS. 30 and 31 are respectively diagrams viewed from the respective directions of XXX and XXXXI in FIG. 29.
Figure 31:
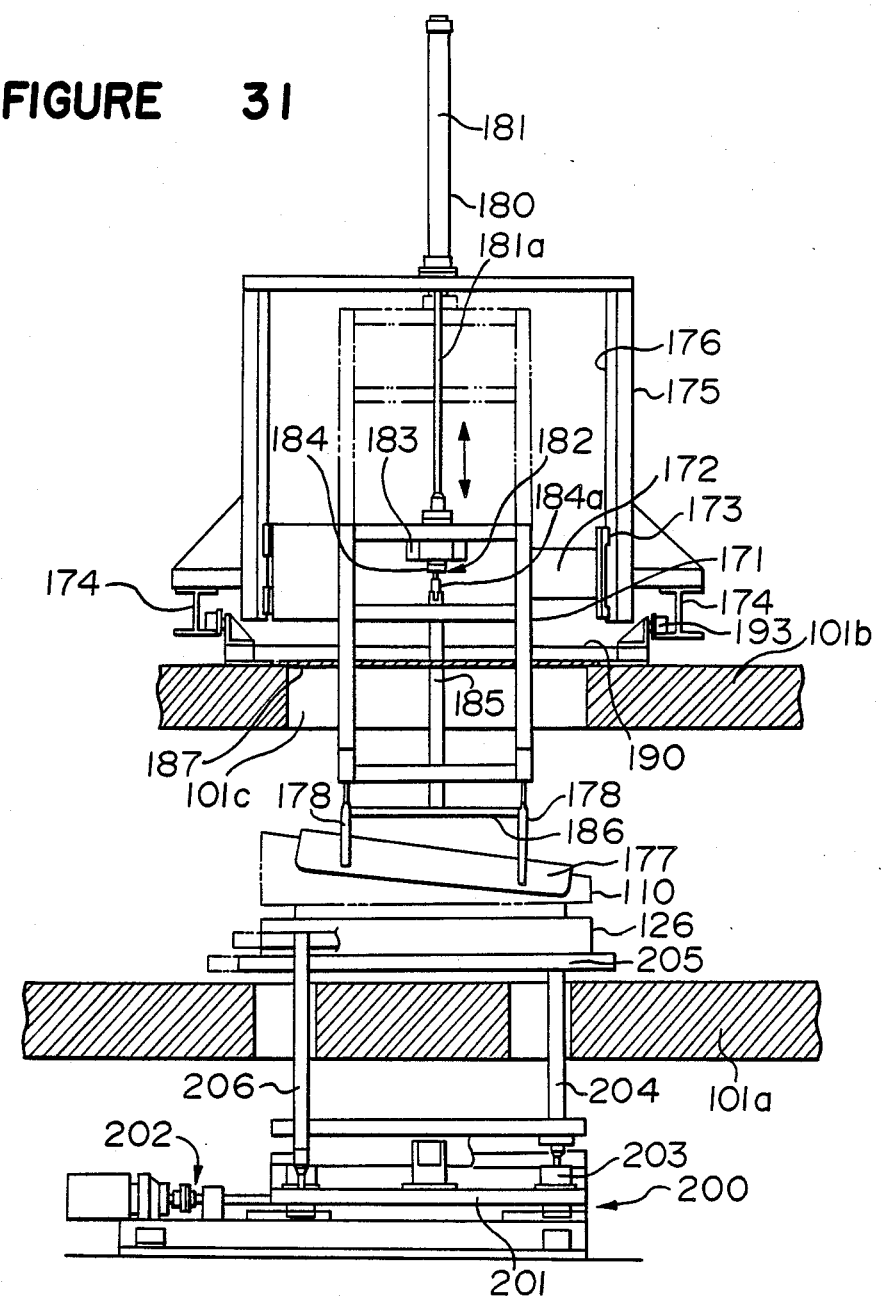

Then, the auxiliary pressing member driving means 152 are operated. As shown in FIG. 27, a moment force caused by the weight 141 acts on the auxiliary pressing member 137 so that the auxiliary pressing member 137 is maintained at a position sufficiently apart from the side portion of the provisionally shaped glass plates 100 before the auxiliary pressing member driving means 152 is driven, as shown in FIG. 27. Accordingly, there is no possibility that the auxiliary pressing member 137 comes into contact with the provisionally shaped glass plates 100 when the supporting arm 131 is brought to the vertical position. Upon actuating the auxiliary pressing member driving means 152, the hanging rods 157 are lowered by a predetermined distance by overcoming the moment force of the weight 141 as shown by imaginary line in FIG. 27, so that the contacting plate 158 pushes down the engage bolt 144 by a predetermined distance. Then, the swing arm 139 is turned around the pivotal shaft 138 at a predetermined angle, whereby the auxiliary pressing member 137 is moved to the predetermined bend-shaping position Z which is apart from a distance corresponding to the thickness of the two overlapping glass plates 100 from the bend-shaping surface 112a of the movable mold 112. Then, an incompletely shaped portion 100a at each side portion of the glass plates 100 is locally press-shaped by the auxiliary pressing member 137. Thus, a regular deep-bent portion 100b at each side is obtainable as indicated by the imaginary line in FIG. 27. After the finalization of the regular deep-bending operations, the glass plates 100 are transferred into the cooling stage ST3 as shown in FIG. 2, and then the entire steps for bending the two overlapping glass plates 100 for a laminated glass is finished.

FIGS. 28 to 31 show another embodiment of the apparatus for bending glass plates for a laminated glass according to the present invention.

The basic construction of this embodiment is similar to the embodiment explained with reference to FIGS. 16 to 27 except that the construction of the auxiliary pressing means 170 is different. Accordingly, the same reference numerals designate the same structural elements and description of these elements is omitted.

Each of the auxiliary pressing means 170 is arranged above the heating/bending furnace 101, which corresponds to the pressing stage ST2.

The auxiliary pressing means 170 has a supporting frame 171 which is vertically movable to pass through an opening 101c formed in the upper wall 101b of the heating/bending furnace 101, the auxiliary pressing member 177 attached to the supporting frame 171 so as to be turnable, a supporting frame driving means 180 for moving the supporting frame 171 in the vertical direction, and an auxiliary pressing member driving means 182 for moving the auxiliary pressing member 177 toward the bend-shaping surface 112a of the movable mold 112 at the set position S by a predetermined amount of distance.

The supporting frame 171 is formed by attaching a reinforcing bar so as to traverse legs of a ⊃-like frame with its opening opened downwardly. A pair of guide arms 172 are provided at both legs, and a slider 173 is attached to each of the guide arms 172. The structure for supporting the supporting frame 171 is such that a ⊃-like fixed frame 175 with its opening opened downwardly is provided between a pair of fitting channels 174 above and outside the heating/bending furnace 101, a guide rail 176 is provided inside a vertical frame member of the fixed frame 175, and the slider 173 of the supporting frame 171 is slidably attached to the guide rail 176.

The construction of the auxiliary pressing member 177 is similar to that as mentioned before. As a structure for supporting the auxiliary pressing member 177, the central portion of a swing arm 178 is supported in a turnable manner at both lower edges of the supporting frame 171, and the auxiliary pressing member 177 is fitted to one of the swing arms 178.

The supporting frame driving means 180 is constituted by an air cylinder 181 having a piston rod 181b as a driving source attached to the central portion of the top of the fixed frame 175 so as to extend vertically and to connect the free end of the piston rod 181a of the air cylinder 181 to the central portion of the top of the supporting frame 171, whereby the auxiliary pressing means 170 can be inserted in the heating/bending furnace 101 or can be withdrawn from the same.

The auxiliary pressing member driving means 182 comprises an air cylinder 184 having a piston rod 184a as a driving source attached to an upper frame 171a of the supporting frame 171 through the slider 173 so as to be turnable in the vertical direction, an operating rod 185 attached to the free end of the piston rod 184a of the air cylinder 184, and a connecting bar 186 connected to the lower end of the operating rod 185 so as to extend horizontally. The two ends of the connecting bar 186 are respectively connected to the swing arms 178 at the side of the auxiliary pressing member 177. The auxiliary pressing member driving means 182 is to drive the air cylinder 184 so that the piston rod 184a at the advanced position is retracted by a predetermined distance.

In FIGS. 28 to 31, a reference numeral 187 designates a cover attached to an intermediate portion of the supporting frame 171 so as to close the opening 101c of the heating/bending furnace 101 when the supporting frame 171 reaches the lowest position, a numeral 190 designates a shutter for closing the opening 101c when the auxiliary pressing means 170 is taken out of the heating/bending furnace 101 for the purpose of adjustment, maintenance and so on, a numeral 191 designates an air cylinder having a piston rod 191a for driving the shutter 190, a numeral 192 designates a driving force transmitting member for connecting the shutter 190 with the piston rod 191a of the air cylinder 191, and a numeral 193 designates a guide roller for guiding the shutter 190 along the fitting channels 174.

In this embodiment, the truck 126 driven by an chain conveyor 127. The truck 126 is used as the transferring means 125 for the bending mold 110 in the same manner as the embodiments as described before. However, in this particular embodiment, the truck 126 is temporarily separated from the chain conveyor 127 at the pressing stage and is mounted on a float positioning table 200.

The float positioning table 200 is constituted by a positioning base 201 arranged below the heating/bending furnace 101 so that it is slidable along the direction of moving the glass plates 100 within a predetermined range, a position determining driving means 202 comprising a motor, a ball screw and so on which moves the positioning base 201 to a regular position, a lifting means 203 such as a jack having a low stroke which is arranged at a suitable location on the positioning base 201, a plurality of vertical bars 204 supported by the lifting means 203 and extending through the lower wall 101a of the heating/bending furnace 101, a pushing plate 205 fixed to the vertical bars 204 in the heating/bending furnace 101, and a sliding means 206 provided at both sides of the truck 126 so as to support slidably within a predetermined range along the width direction of the heating/bending furnace 101.

The float positioning table 200 operates as follows. When the truck 126 reaches a point before the regular positioning point, the lifting means 203 is actuated to thereby raise the pushing plate 205, whereby the truck 126 is separated from the chain conveyor 127. Then, the positioning base 201 is moved to the regular positioning point.

The operation of the bend-shaping apparatus of this embodiment of the present invention will be described.

Figure 32:
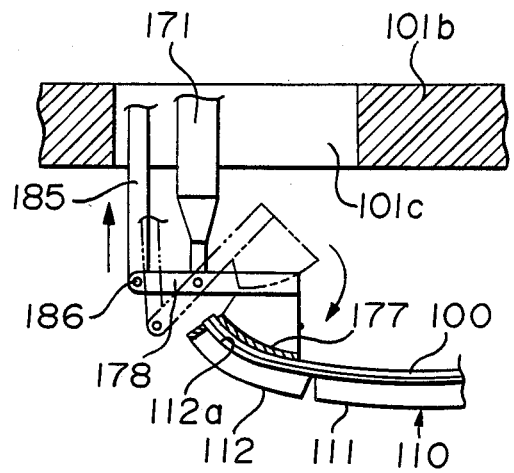
FIG. 32 is a diagram showing in detail the auxiliary pressing step as in FIG. 28.

In this embodiment, the basic operation at the heating/bending stage ST1 is substantially the same as that of the embodiments described before, namely, the provisionally shaped glass plates 100 are transferred into the pressing stage ST2 together with the bending mold 110. In this case, the truck 126 carrying the bending mold 110 is first positioned on the float positioning table 200, and at the same time, the movable molds 112 are clamped by the clamping means 160 in the same manner as in the previously mentioned embodiments. Then, the auxiliary pressing means 170 are actuated. As shown in FIG. 32, the auxiliary pressing member driving means 182 are operated so that the auxiliary pressing members 177 are moved toward the bend-shaping surfaces 112a of the movable molds 112 as indicated by solid lines to thereby press the incompletely shaped portions at both side portions of the glass plates 100 so as to correspond to the curved surface of the auxiliary pressing members 177.

In this embodiment, since the truck 126 is slidably supported within a predetermined range along the width direction of the heating/bending furnace 101, the bend-shaping surfaces 112a of the movable molds 112 can be pushed by the auxiliary pressing members 177 at correct positions even though errors occur in the width direction of the heating/bending furnace 101 due to irregular movements of the truck 126 during the transferring of the truck 126 by the chain conveyor 127. Thus, the deviation in position of the truck 126 can be effectively corrected.

As described above, in accordance with the method of and the apparatus for bending glass plates for a laminated glass, the glass plates placed on a bending mold in an overlapping state are heated to a temperature capable of softening glass whereby the glass plates are provisionally shaped into a shape substantially corresponding to the shape of the bending mold by their own deadweight, and, thereafter, the incompletely shaped portion of the glass plates is subjected locally to pressing operations. Accordingly, the side portions of the glass plates can be certainly shaped to have deeply bent portions, and the degree of freedom in shaping of the glass plates into a desired shape can be increased.

Heretofore, in order to deep-bend the glass plates for a laminated glass to have a desired radius of curvature, a complicated step of a so-called over-size method have had to be taken. However, in accordance with the present invention, it is sufficient to use glass plates so that they have dimensions which correspond to those of a laminated glass as the final product, whereby a laminated glass having a desired radius of curvature at its peripheral portions is obtainable by deep-bending operations. Further, the laminated glass having a deep-bent portion can be easily produced at a reduced cost.

In accordance with the method of and the apparatus for the bending the glass plates for a laminated glass as disclosed herein, side portions of the glass plates are pressed in the direction substantially normal to the surface of the portions to be deeply bent by means of the auxiliary pressing members. Accordingly, the generation of wrinkles at the deep-bent portions in the glass plates can be effectively reduced.

In accordance with the apparatus for bending glass plates as disclosed herein, the auxiliary pressing members of the auxiliary pressing means are provided at the side of the transferring means for the bending mold. Accordingly, adjustment of the positional relationship between the bending mold and the auxiliary pressing members can be made by adjusting elements on the transferring means, whereby the positional relationship can be correctly maintained to thereby increase reliability in pressing operations by the auxiliary pressing means.

In accordance with the apparatus for bending glass plates as disclosed herein, it is unnecessary to heat the auxiliary pressing means at the heating/bending stage, since the auxiliary pressing means are provided at the pressing stage. Accordingly, thermal efficiency can be improved at the heating/bending stage, and the service life of the auxiliary pressing means can be prolonged. Further, when a number of bending molds are used to produce a number of laminated glass, it is unnecessary to provide the auxiliary pressing means for each of the bending molds. Accordingly, the number of structural elements can be reduced for the bend-shaping apparatus for producing the laminated glass to thereby simplify the construction of the apparatus.

In one embodiment of the present invention, a pair of taper rings are provided adjacent the outer side portions of the bending mold to receive both side portions of the two overlapping glass plates placed on the bending mold. The side portions to be deeply bent of the overlapping glass plates are heated by means of heaters at a higher temperature than other portions to form bent portions by the deadweight of the glass plates, and the locally heated portions are pressed by the auxiliary pressing members from the upper part, whereby the two side portions of the glass plates can be bent to provide a desired radius of curvature. For instance, in case of bending the glass plates by only the deadweight of the glass plates without conducting the pressing operation, it is difficult to bend the side portion of the two overlapping glass plates to have a radius of curvature less than 600 mmR-10,000 mmR. However, by applying a pressing force by means of the auxiliary pressing member, it is possible to bend the glass plates to have a radius of curvature of 80 mmR-200 mmR. Further, by supporting both side end portions of the glass plates by the taper rings, a trace resulted on the surface of the lower glass plated by the contact of the bending mold when bent-shaping operations are conducted can be eliminated (in the conventional method, the both side end portions of the glass plates extend about 4 mm-10 mm from the end portions of the bending mold).

Further, in one embodiment of the present invention, a colored layer of ceramic colored ink is printed on the deep-bent portion of the glass plates. Accordingly, the trace of the glass plate by the contact with the bending mold, if it is happened, becomes inconspicuous because a colored zone is formed by baking the ceramic colored ink at the portions to thereby increase productivity of laminated glass.

We claim:

1. A method of bending glass plates for a laminated glass wherein side portions of two overlapping glass plates are simultaneously subjected to deep-bending, said method comprising:
   (a) a provisional shaping step of heating said two glass plates placed on a bending mold by elevating temperature to a temperature capable of bending glass at a heating/bending stage in a heating/bending furnace so that said two glass plates are provisionally shaped by their own deadweight into a shape corresponding to the shape of said bending mold and
   (b) a pressing step of pressing a portion to be deeply bent of said glass plates to a deep-bending portion of a bending mold at a pressing stage which is after said heating/bending stage in said heating/bending furnace, wherein:
   (c) said two glass plates are placed in an overlapping relationship on a splittable type deadweight bending mold provided with a shaping surface, a movable mold, and a fixed mold;
   (d) said provisional shaping step includes heating locally a side portion to be deeply bent of said two overlapping glass plates at a higher temperature; and
   (e), prior to said pressing step, said provisionally shaped two overlapping glass plates are moved from said splittable type deadweight bending mold to a non-splittable bending mold.

2. The method of bending glass plates according to claim 1, wherein:
   (a) said two glass plates are placed on a deadweight bending mold provided with a taper ring at a side edge which is formed near a deep-bending portion in said deadweight bending mold and
   (b) said taper ring has at its upper surface a shaping surface corresponding to a shape of a side portion of said glass plates.

3. The method of bending glass plates according to claim 1, wherein:
   (a) one of said to glass plates has a colorprinted ceramic colored frit layer at at least a portion to be deeply bent of a side of the glass plate which is put on the other glass plate;
   (b) said provisional shaping step includes firmly forming by baking said printed layer of the ceramic colored frit on the surface of the glass plate; and
   (c) said pressing step includes pressing said printed layer of the ceramic colored frit firmly formed by baking on the portion to be deeply bent of the glass plate placed on the other glass plate in the two overlapping glass plates, from the top.

4. The method of bending glass plates according to claim 1, wherein:
   (a) one of said two glass plates has a color-printed ceramic colored frit layer at at least a portion to be deeply bent of a side of the glass plate which is put on the other glass plate;
   (b) said provisional shaping step includes firmly forming by baking said printed layer of the ceramic colored frit on the surface of the glass plate; and
   (c), prior to conducting said pressing step, the glass plate at the upper position is moved under the other glass plate so that said printed layer of the ceramic colored frit is between the two overlapping glass plates.

5. The method of bending glass plates according to claim 1, wherein said two overlapping glass plates are pressed in said pressing step so that a pressing force is applied to a portion to be deeply bent of said glass plates in a direction substantially normal to the surface to be deeply bent.

6. An apparatus for bending glass plates for a laminated glass wherein side portions of two overlapping glass plates are simultaneously subjected to deep-bending, said apparatus being characterized by comprising:
   a split type deadweight bending mold provided with a first bend-shaping surface which corresponds to an intermediate curved portion of said glass plates to be shaped and a second bend-shaping surface which corresponds to a portion to be deeply bent of said glass plates,
   a non-split type bending mold adapted to receive thereon the two overlapping glass plates and having a bend-shaping surface for bending the glass plates in a desired shape,
   a transferring means to transfer said glass plates from said split type deadweight bending mold to said nonsplit type bending mold,
   an auxiliary pressing means placed above said nonsplit type bending mold so as to correspond to said portion to be deeply bent of said glass plates, and a moving mechanism to move said auxiliary pressing means.

7. The apparatus for bending glass plates according to claim 6, wherein said auxiliary pressing means is adapted to press said portion to be deeply bent of said glass plates previously shaped at a pressing stage so that a pressing force is applied to that portion in a direction substantially normal to the surface of said glass plates to be deeply bent.

8. The apparatus for bending glass plates according to claim 6, wherein:
   (a) said auxiliary pressing means comprises a supporter provided at a transferring means so as to be capable of rising and falling;
   (b) said auxiliary pressing member is supported by said supporter in a swingable manner;
   (c) said apparatus further comprises a supporter driving means for moving said supporter from the falling position to the rising position when said bending mold reaches a pressing stage so that said auxiliary pressing member is brought to a position facing said bend-shaping surface of said mold; and
   (d) said apparatus further comprises a pressing piece driving means for moving said auxiliary pressing member toward said bend-shaping surface of said mold by a predetermined distance when said bending mold reaches said pressing stage.

9. The apparatus for bending glass plates according to claim 6, wherein:
   (a) said auxiliary pressing means comprises a supporter provided at a pressing stage so as to be capable of advancing and retracting;
   (b) said auxiliary pressing member is supported at the end of said supporter in a swingable manner;
   (c) said apparatus further comprises a supporter driving means for moving said supporter to such a position that said auxiliary pressing member faces said bend-shaping surface of said movable mold when said bending mold reaches a pressing stage; and
   (d) said apparatus further comprises an auxiliary pressing member driving means for moving said auxiliary pressing member toward said bend-shaping surface of said movable mold by a predetermined distance when said bending mold reaches said pressing stage.

* * * * *